US012609966B2

(12) United States Patent　　(10) Patent No.: US 12,609,966 B2
Patton et al.　　(45) Date of Patent: Apr. 21, 2026

(54) CROWDSOURCED SECURITY AWARENESS WORKFLOW RECOMMENDATION MODEL FOR IMPROVED CYBERSECURITY OF AN ORGANIZATION

(71) Applicant: KnowBe4, Inc., Clearwater, FL (US)

(72) Inventors: Mark William Patton, Tampa, FL (US); Greg Kras, Tampa, FL (US)

(73) Assignee: KnowBe4, Inc.

( * ) Notice: Subject to any disclaimer, the term of this patent is extended or adjusted under 35 U.S.C. 154(b) by 90 days.

(21) Appl. No.: 18/621,671

(22) Filed: Mar. 29, 2024

(65) Prior Publication Data

US 2024/0333771 A1　　Oct. 3, 2024

Related U.S. Application Data

(60) Provisional application No. 63/455,628, filed on Mar. 30, 2023.

(51) Int. Cl.
H04L 9/40　　(2022.01)
(52) U.S. Cl.
CPC .......... H04L 63/20 (2013.01); H04L 63/1433 (2013.01)
(58) Field of Classification Search
CPC ............................ H04L 63/20; H04L 63/1433
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,912,687 B1 | 3/2018 | Wescoe et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

*Primary Examiner* — Noura Zoubair
(74) *Attorney, Agent, or Firm* — Foley & Lardner LLP

(57) ABSTRACT

Systems and methods are described for recommendation of one or more security awareness workflows are described. One or more security awareness workflows may be deployed to deliver one or more remedial responses to one or more users in response to detection of one or more actions of the one or more users. An effectiveness of the one or more security awareness workflows are assessed and based at least on the assessment, one or more effectiveness metrics for the one or more security awareness workflows are determined. The one or more effectiveness metrics may represent the effectiveness of the one or more security awareness workflows. Based at least on the one or more effectiveness metrics, a recommendation of one or more security awareness workflow configurations may be identified.

22 Claims, 11 Drawing Sheets

700

Deploy one or more security awareness workflows, the one or more security awareness workflows delivering one or more remedial responses to one or more users in response to detection of one or more actions of the one or more users — 702

Assess an effectiveness of the one or more security awareness workflows — 704

Determine, based at least on the assessment, one or more effectiveness metrics for the one or more security awareness workflows, the one or more effectiveness metrics representing the effectiveness of the one or more security awareness workflows — 706

Identify, based on at least one of the one or more effectiveness metrics, a recommendation of one or more security awareness workflow configurations comprising a selection of one or more components of the one or more security awareness workflows to use in the one or more security awareness workflow configurations — 708

Display, via an interface, the recommendation of the one or more security awareness workflow configurations — 710

(56)        References Cited

U.S. PATENT DOCUMENTS

| | | | |
|---|---|---|---|
| 10,904,186 B1 | 1/2021 | Everton et al. | |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 2016/0164898 A1 | 6/2016 | Belani et al. | |
| 2016/0301705 A1 | 10/2016 | Higbee et al. | |
| 2019/0005428 A1* | 1/2019 | Kras | G06Q 10/06314 |
| 2019/0173819 A1 | 6/2019 | Wescoe et al. | |
| 2019/0245885 A1 | 8/2019 | Starink et al. | |
| 2020/0053114 A1* | 2/2020 | Shabtai | H04L 63/1441 |
| 2020/0311260 A1 | 10/2020 | Klonowski et al. | |
| 2021/0185075 A1 | 6/2021 | Adams | |
| 2021/0194924 A1 | 6/2021 | Heinemeyer et al. | |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0130274 A1 | 4/2022 | Krishna Raju et al. | |
| 2022/0286419 A1 | 9/2022 | Stetzer et al. | |

* cited by examiner

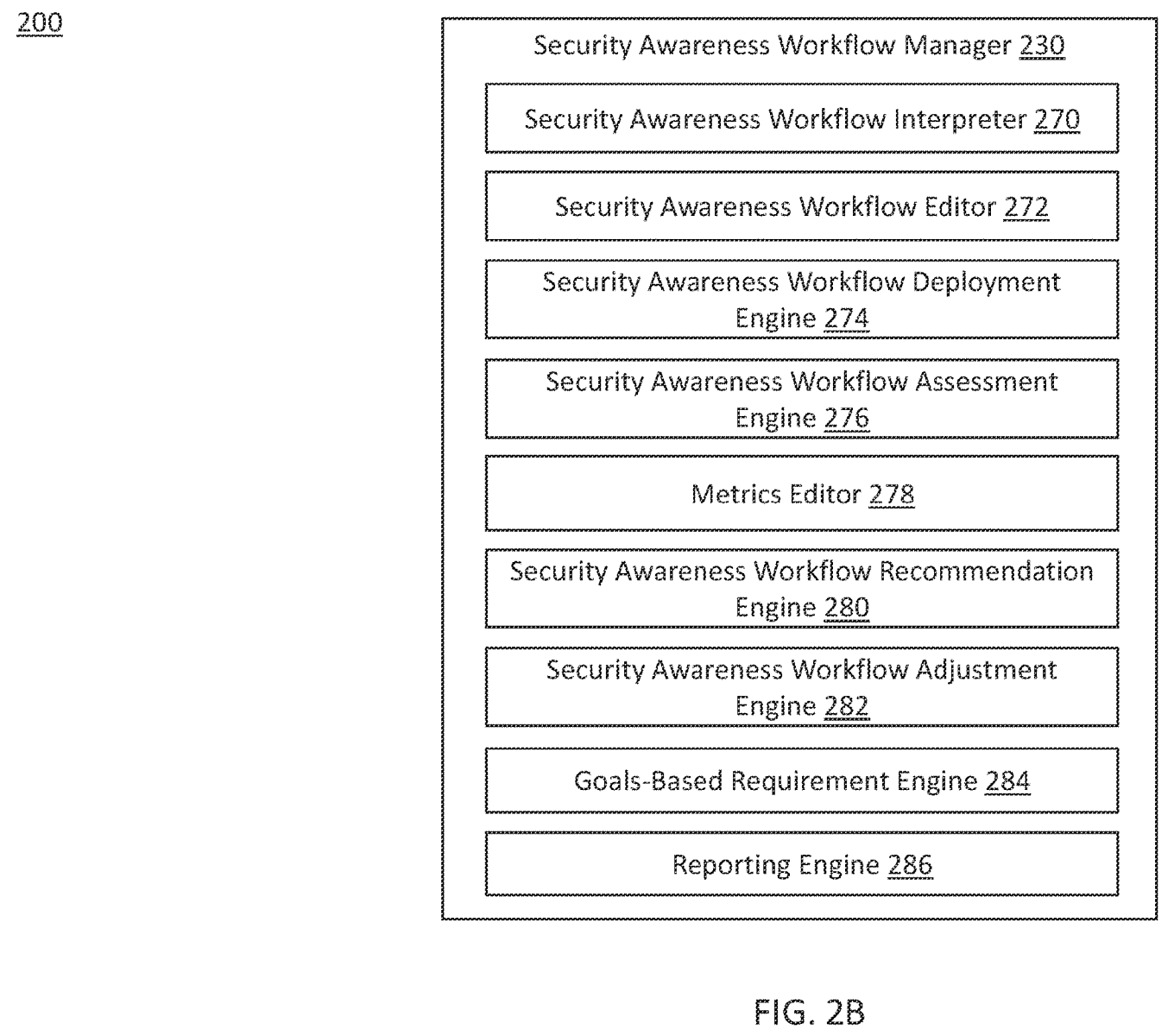

200

Security Awareness Workflow Manager 230

Security Awareness Workflow Interpreter 270

Security Awareness Workflow Editor 272

Security Awareness Workflow Deployment Engine 274

Security Awareness Workflow Assessment Engine 276

Metrics Editor 278

Security Awareness Workflow Recommendation Engine 280

Security Awareness Workflow Adjustment Engine 282

Goals-Based Requirement Engine 284

Reporting Engine 286

FIG. 2B

| ACTION | CONDITION | SCHEDULE | TARGET | RESPONSE | CHANNEL |
|--------|-----------|----------|--------|----------|---------|
| 304 | 306 | 308 | 310 | 312 | 314 |

300

400

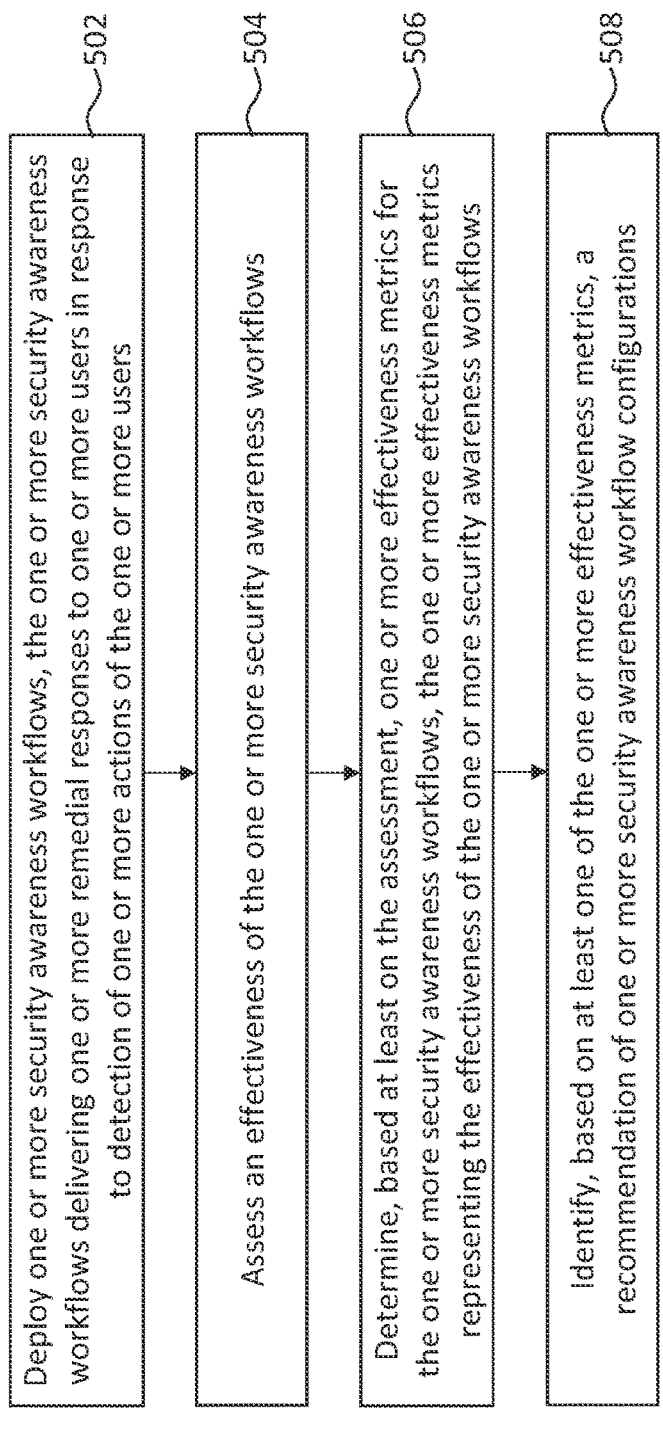

500

Deploy one or more security awareness workflows, the one or more security awareness workflows delivering one or more remedial responses to one or more users in response to detection of one or more actions of the one or more users ⸾502

Assess an effectiveness of the one or more security awareness workflows ⸾504

Determine, based at least on the assessment, one or more effectiveness metrics for the one or more security awareness workflows, the one or more effectiveness metrics representing the effectiveness of the one or more security awareness workflows ⸾506

Identify, based on at least one of the one or more effectiveness metrics, a recommendation of one or more security awareness workflow configurations ⸾508

FIG. 5

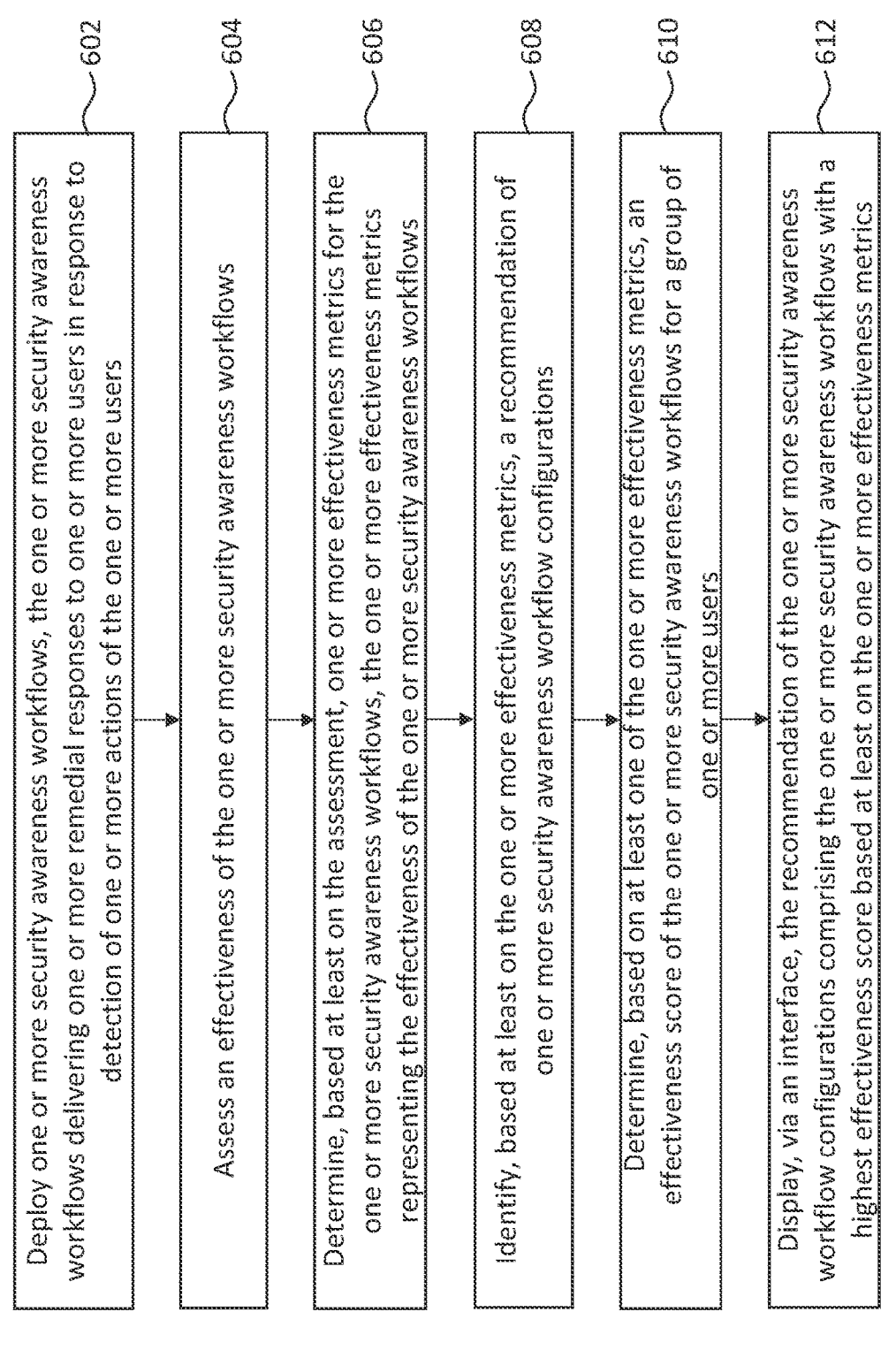

Deploy one or more security awareness workflows, the one or more security awareness workflows delivering one or more remedial responses to one or more users in response to detection of one or more actions of the one or more users ⟋602

Assess an effectiveness of the one or more security awareness workflows ⟋604

Determine, based at least on the assessment, one or more effectiveness metrics for the one or more security awareness workflows, the one or more effectiveness metrics representing the effectiveness of the one or more security awareness workflows ⟋606

Identify, based at least on the one or more effectiveness metrics, a recommendation of one or more security awareness workflow configurations ⟋608

Determine, based on at least one of the one or more effectiveness metrics, an effectiveness score of the one or more security awareness workflows for a group of one or more users ⟋610

Display, via an interface, the recommendation of the one or more security awareness workflow configurations comprising the one or more security awareness workflows with a highest effectiveness score based at least on the one or more effectiveness metrics ⟋612

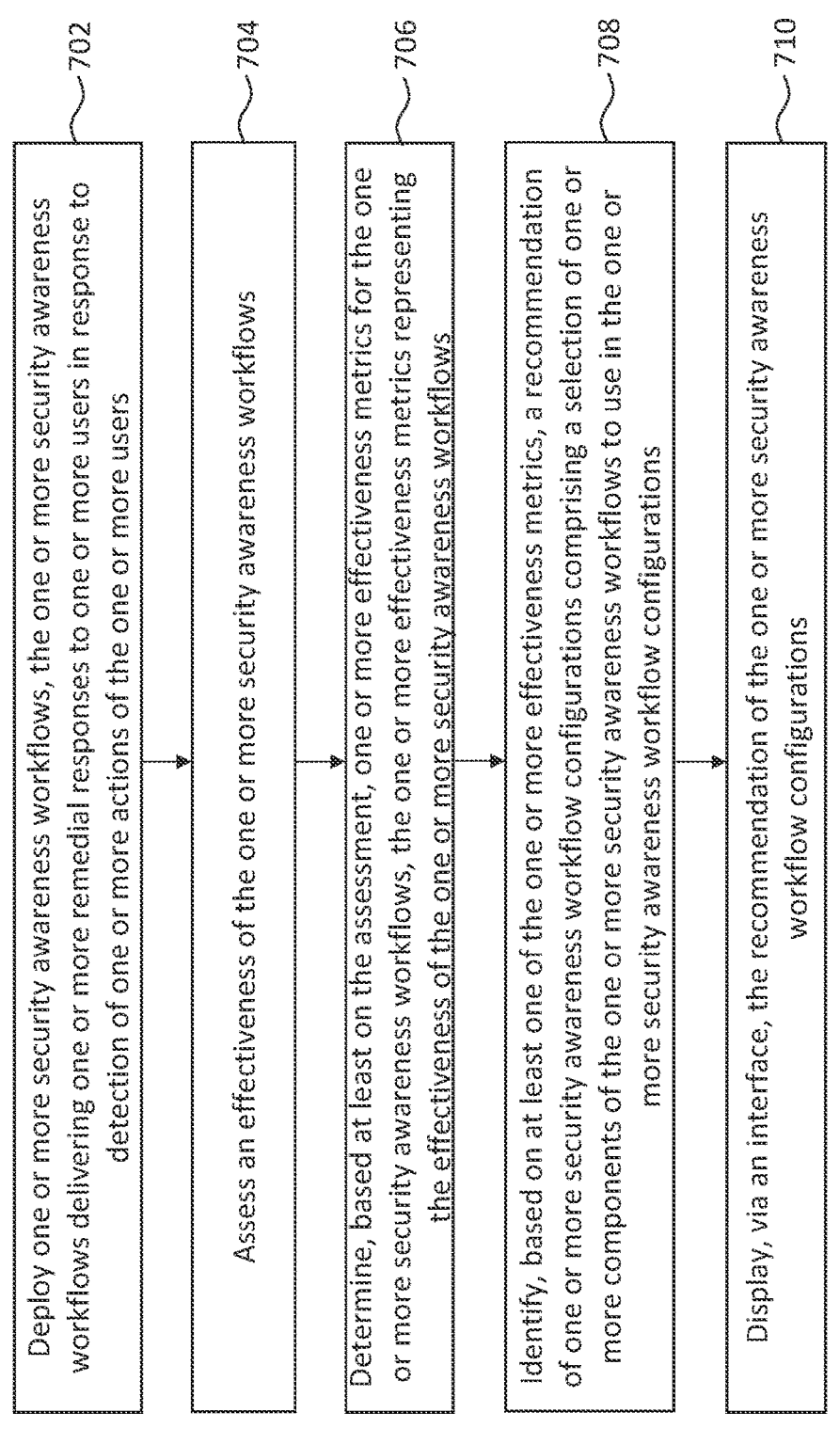

Deploy one or more security awareness workflows, the one or more security awareness workflows delivering one or more remedial responses to one or more users in response to detection of one or more actions of the one or more users ⟲702

Assess an effectiveness of the one or more security awareness workflows ⟲704

Determine, based at least on the assessment, one or more effectiveness metrics for the one or more security awareness workflows, the one or more effectiveness metrics representing the effectiveness of the one or more security awareness workflows ⟲706

Identify, based on at least one of the one or more effectiveness metrics, a recommendation of one or more security awareness workflow configurations comprising a selection of one or more components of the one or more security awareness workflows to use in the one or more security awareness workflow configurations ⟲708

Display, via an interface, the recommendation of the one or more security awareness workflow configurations ⟲710

CROWDSOURCED SECURITY AWARENESS WORKFLOW RECOMMENDATION MODEL FOR IMPROVED CYBERSECURITY OF AN ORGANIZATION

RELATED APPLICATIONS

This patent application claims the benefit of and priority to U.S. Provisional Patent Application No. 63/455,628 titled "CROWD-SOURCED SECURITY AWARENESS WORK-FLOW RECOMMENDATION MODEL FOR IMPROVED CYBERSECURITY OF AN ORGANIZATION" and filed Mar. 30, 2023, the contents of all of which are hereby incorporated herein by reference in its entirety for all purposes.

FIELD OF DISCLOSURE

This disclosure relates to security awareness management. In particular, the present disclosure relates to crowdsourced security awareness workflow recommendation models for improved cybersecurity of an organization.

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage are increasing every year. Many organizations use cybersecurity tools such as antivirus, anti-ransomware, anti-phishing, and other quarantine platforms to detect and intercept known cybersecurity attacks. However, new and unknown security threats involving social engineering may not be readily detectable by such cyber security tools, and the organizations may have to rely on their employees (referred to as users) to recognize such threats. To enable their users to stop or reduce the rate of cybersecurity incidents, the organizations may conduct security awareness training for their users. The organizations may conduct security awareness training through in-house cybersecurity teams or may use third parties which are experts in matters of cybersecurity. The security awareness training may include cybersecurity awareness training, for example, via simulated phishing attacks, computer-based training, and other training programs. Through security awareness training, organizations educate their users on how to detect and report suspected phishing communication, avoid clicking on malicious links, and use applications and websites safely.

BRIEF SUMMARY OF THE DISCLOSURE

Systems and methods for recommendation of one or more security awareness workflows are described. In an example embodiment, a method is described for deploying one or more security awareness workflows. In examples, the one or more security awareness workflows may deliver one or more remedial responses to one or more users in response to detection of one or more actions of the one or more users. In some embodiments, the method includes assessing an effectiveness of the one or more security awareness workflows. In some embodiments, the method includes determining, based at least on the assessment, one or more effectiveness metrics for the one or more security awareness workflows. In examples, the one or more effectiveness metrics may represent the effectiveness of the one or more security awareness workflows. In some embodiments, the method includes identifying, based at least on the one or more effectiveness metrics, a recommendation of one or more security awareness workflow configurations.

In some embodiments, the one or more security awareness workflows comprise one or more actions and one or more conditions to trigger the one or more actions. In examples, the one or more conditions include one or more action criteria applied to the one or more actions of the one or more users.

In some embodiments, the one or more effectiveness metrics comprise a combination of one or more effectiveness criteria, changes in the one or more effectiveness criteria, one or more thresholds applied to the one or more effectiveness criteria or the one or more thresholds applied to the changes in the one or more effectiveness criteria.

In some embodiments, the one or more effectiveness metrics comprise a count of occurrences of the one or more actions of the one or more users that pose a security risk and that trigger the one or more security awareness workflows.

In some embodiments, the one or more effectiveness metrics comprise a count of the one or more users clicking on a link in a simulated phishing communication. In examples, the one or more users may be based at least on one or more user attributes.

In some embodiments, the method further comprises determining, based at least on the one or more effectiveness metrics, an effectiveness score of the one or more security awareness workflows for a group of one or more users.

In some embodiments, the method further comprises determining an action reduction threshold for a number of occurrences of the one or more actions of the one or more users within a time period.

In some embodiments, the method further comprises determining a classification of effectiveness of the one or more security awareness workflows by calculating a residual between the action reduction threshold and the effectiveness score of the one or more security awareness workflows.

In some embodiments, the method further comprises displaying, via an interface, the recommendation of the one or more security awareness workflow configurations including a selection of one or more components of the one or more security awareness workflows to use in the one or more security awareness workflow configurations.

In some embodiments, the method further comprises displaying, via an interface, the recommendation of the one or more security awareness workflow configurations including the one or more security awareness workflows with a highest effectiveness score based at least on the one or more effectiveness metrics.

In some embodiments, the recommendation includes identification of one or more security awareness workflow configurations from other organizations.

In another example embodiment, a system is described which comprises one or more servers including one or more processors, coupled to memory. In embodiments, the one or more servers are configured to deploy one or more security awareness workflows. In examples, the one or more security awareness workflows may deliver one or more remedial responses to one or more users in response to detection of one or more actions of the one or more users. In some embodiments, the one or more servers are configured to assess an effectiveness of the one or more security awareness workflows. In some embodiments, the one or more servers are configured to determine, based at least on the assessment, one or more effectiveness metrics for the one or more security awareness workflows. In examples, the one or more effectiveness metrics may represent the effectiveness of the one or more security awareness workflows. In some embodiments, the one or more servers are configured to identify, by based at least on the one or more effectiveness metrics, a recommendation of one or more security awareness workflow configurations.

In some embodiments, the system is further configured to determine, based at least on the one or more effectiveness metrics, an effectiveness score of the one or more security awareness workflows for a group of one or more users.

In some embodiments, the system is further configured to determine an action reduction threshold for a number of occurrences of the one or more actions of the one or more users within a time period.

In some embodiments, the system is further configured to determine a classification of effectiveness of the one or more security awareness workflows by calculating a residual between the action reduction threshold and the effectiveness score of the one or more security awareness workflows.

In some embodiments, the system is further configured to display, via an interface, the recommendation of the one or more security awareness workflow configurations including a selection of one or more components of the one or more security awareness workflows to use in the one or more security awareness workflow configurations.

In some embodiments, the system is further configured to display, via an interface, the recommendation of the one or more security awareness workflow configurations including the one or more security awareness workflows with a highest effectiveness score based at least on the one or more effectiveness metrics.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2A and FIG. 2B depict an implementation of some of a server and client architecture of a system for recommendation of one or more security awareness workflows for improved cybersecurity of an organization, according to some embodiments;

FIG. 5 depicts a flowchart for identification of a recommendation of one or more security awareness workflow configurations based on one or more effectiveness metrics, according to some embodiments;

FIG. 6 depicts a flowchart for displaying a recommendation of one or more security awareness workflow configurations, according to some embodiments; and FIG. 7 depicts another flowchart for displaying a recommendation of one or more security awareness workflow configurations, according to some embodiments.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for recommendation of one or more security awareness workflows for improved cybersecurity of an organization.

A. Computing and Network Environment

Figure 1A:
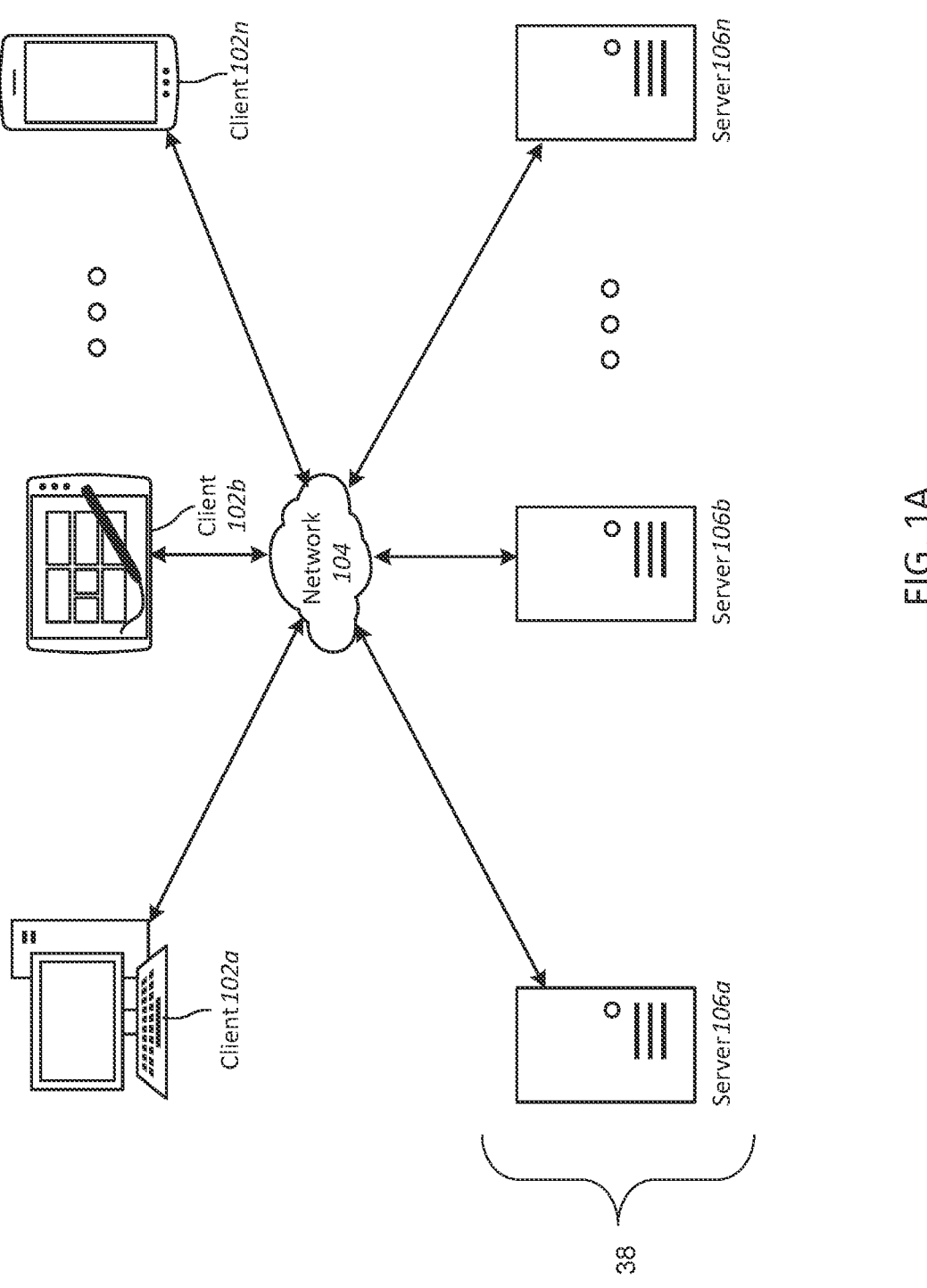
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In a brief overview, the network environment includes one or more clients $102a$-$102n$ (also generally referred to as local machines(s) 102, client(s) 102, client node(s) 102, client machine(s) 102, client computer(s) 102, client device(s) 102, endpoint(s) 102, or endpoint node(s) 102) in communication with one or more servers $106a$-$106n$ (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients $102a$-$102n$.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1xRTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP Internet protocol suite may include application layer, transport layer, Internet layer (including, e.g., IPv4 and IPv6), or the link layer. The network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
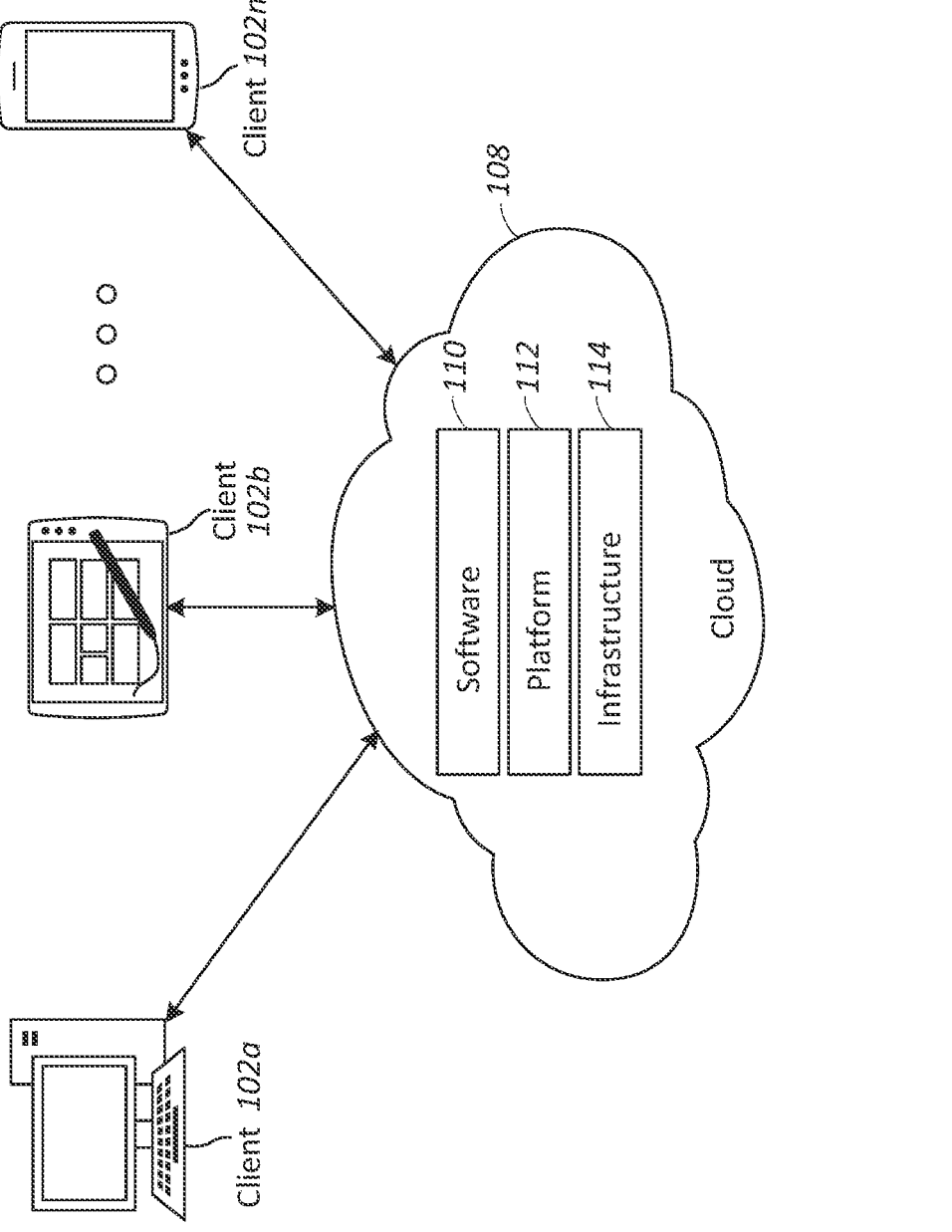
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients.

Private clouds may be connected to the servers 106 over a private network 104. Hybrid clouds 108 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g., Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
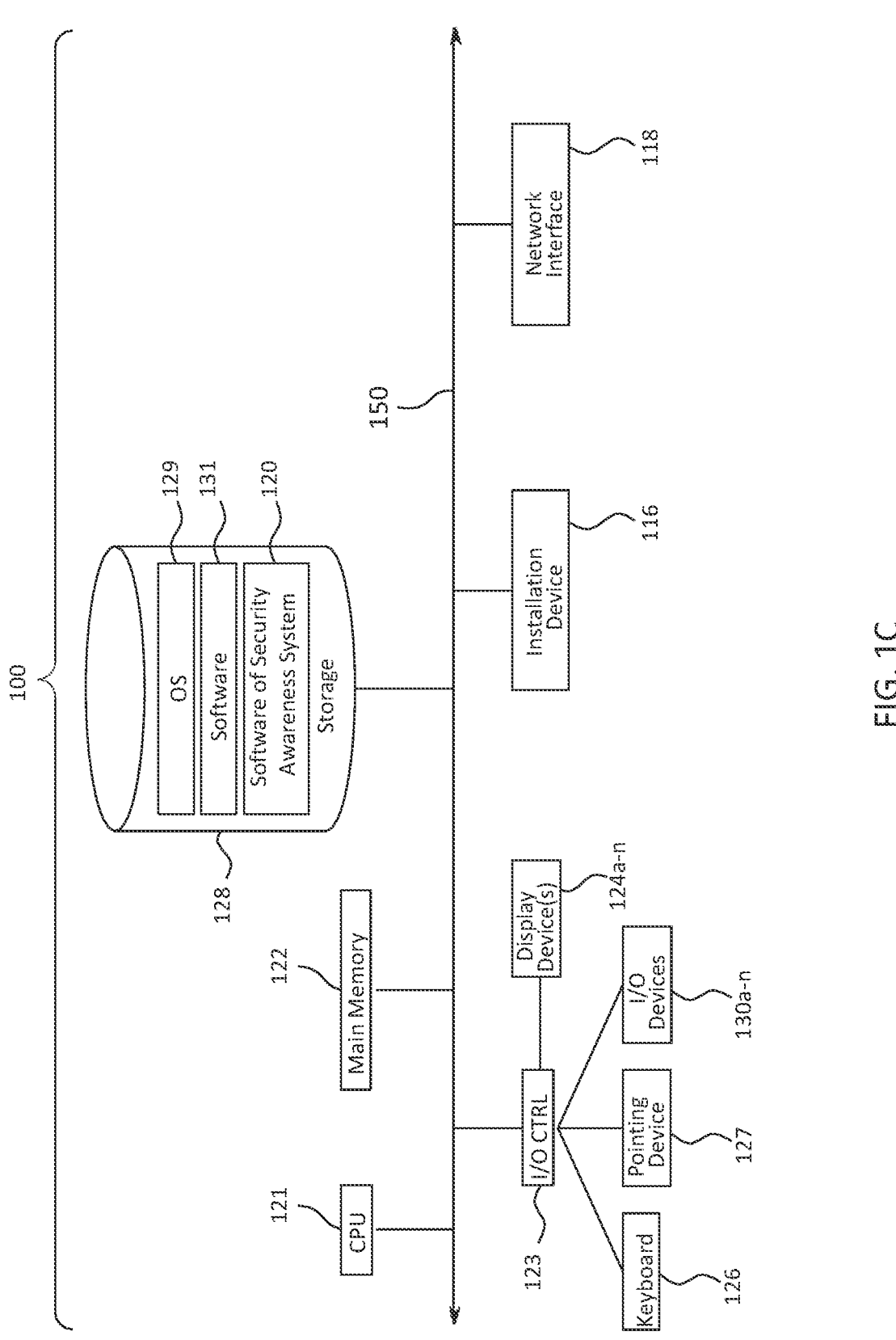
FIG. 1C and FIG. 1D are block diagrams depicting embodiments of computing devices useful in connection with the methods and systems described herein.
Figure 1D:
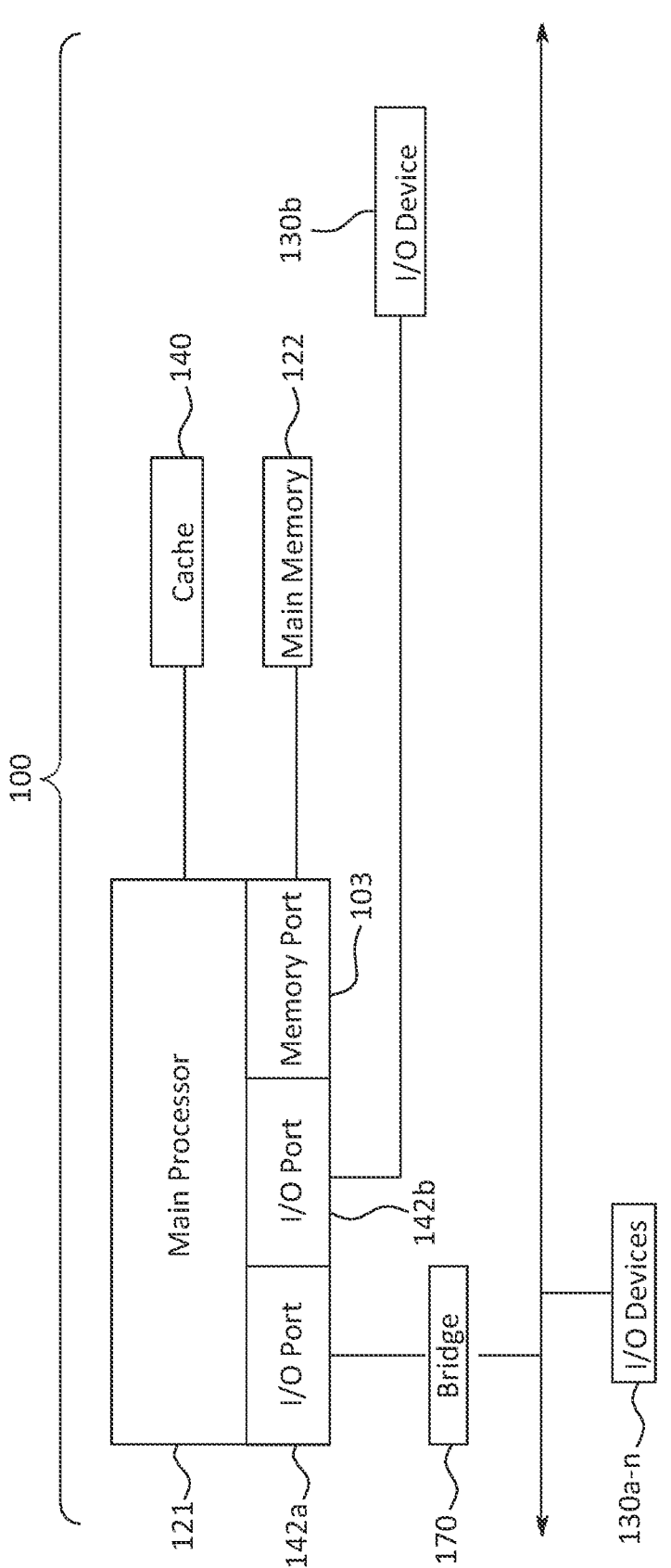

FIG. 1C and FIG. 1D depict block diagrams of a computing device 100 useful for practicing an embodiment of the client 102 or a server 106. As shown in FIG. 1C and FIG. 1D, each computing device 100 includes a central processing unit (CPU) 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an Operating System (OS) 129, software 131, and software of a security awareness system 120. As shown in FIG. 1D, each computing device 100 may also include additional optional elements, e.g., a memory port 103, a bridge 170, one or more Input/Output (I/O) devices 130a-130n (generally referred to using reference numeral 130), and a cache memory 140 in communication with the central processing unit 121.

The central processing unit 121 is any logic circuitry that responds to, and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the central processing unit 121. Main memory unit 122 may be volatile and faster than storage 128 memory. Main memory units 122 may be Dynamic Random-Access Memory (DRAM) or any variants, including Static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile Random Access Memory (NVRAM), flash memory, non-volatile static RAM (nvSRAM), Ferroelectric RAM (FeRAM), Magnetoresistive RAM (MRAM), Phase-change RAM (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above-described memory chips, or any other available memory chips capable of operating as described herein. In the embodiment shown in FIG. 1C, the central processing unit 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the central processing unit 121 communicates directly with cache memory 140 via a secondary bus, sometimes referred to as a backside bus. In other embodiments, the central processing unit 121 communicates with cache memory 140 using the system bus 150. Cache memory 140 typically has a faster response time than main memory 122 and is typically provided by SRAM, BSRAM, or EDRAM. In the embodiment shown in FIG. 1D, the central processing unit 121 communicates with various I/O devices 130 via a local system bus 150. Various buses may be used to connect the central processing unit 121 to any of the I/O devices 130, including a PCI bus, a PCI-X bus, a PCI-Express bus, or a NuBus. For embodiments in which the I/O device is a video display 124, the central processing unit 121 may use an Advanced Graphic Port (AGP) to communicate with the display 124 or the I/O controller 123 for the display 124. FIG. 1D depicts an embodiment of a computer 100 in which the central processing unit 121 communicates directly with I/O device 130b or other central processing units 121' via HYPERTRANSPORT, RAPIDIO, or INFINIBAND communications technology. FIG. 1D also depicts an embodiment in which local busses and direct communication are mixed: the central processing unit 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen displays, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode (LED) displays, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One of ordinary skill in the art will recognize and appreciate the various ways and embodiments that a computing device 100 may be configured to have multiple display devices 124a-124n.

Referring again to FIG. 1C, the computing device 100 may comprise storage device 128 (e.g., one or more hard disk drives or redundant arrays of independent disks) for storing an operating system or other related software, and for storing application software programs such as any program related to the software of security awareness system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices 128 may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Some storage devices 128 may be external and connect to the computing device 100 via a I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116 and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.1 1a/b/g/n/ac CDMA, GSM, WiMAX, and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIG. 1B and FIG. 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the iPod Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple lossless audio file formats and .mov, .m4v, and .mp4 MPEG-4 (H.264/MPEG-4 AVC) video file formats.

In some embodiments, the computing device 100 is a tablet e.g., the iPAD line of devices by Apple; GALAXY TAB family of devices by Samsung; or KINDLE FIRE, by Amazon.com, Inc. of Seattle, Washington. In other embodiments, the computing device 100 is an eBook reader, e.g., the KINDLE family of devices by Amazon.com, or NOOK family of devices by Barnes & Noble, Inc. of New York City, New York.

In some embodiments, the communications device 102 includes a combination of devices, e.g., a smartphone combined with a digital audio player or portable media player. For example, one of these embodiments is a smartphone, e.g., the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Crowdsourced Security Awareness Workflow Recommendation Model for Improved Cybersecurity of an Organization The following describes systems and methods for recommendation of one or more security awareness workflows for improved cybersecurity of an organization.

Cybersecurity incidents cost companies millions of dollars each year in actual costs and can cause customers to lose trust in an organization. The incidents of cybersecurity attacks and the costs of mitigating the damage are increasing every year. Many organizations deploy multiple security and identity-based products to manage security posture. Examples of security and identity-based products include network security products, identity management products across business applications, web security products, endpoint security products, and collaboration tools like email, shared data drives, documentation, ticketing systems etc. These security and identity-based products detect, and report security incidents related to end users, such as users clicking on phishing links, users attempting to visit blocked uniform resource locators (URLs), the presence of weak user passwords, users browsing malicious websites, users downloading malware, etc.

Hackers may exploit users of an organization to gain access to assets of the organization. In response, the organization may provide security training to their users to minimize the chance that the users interact with cybersecurity attacks or are involved in other security incidents. In certain scenarios, generic security training may not be effective in educating users in security awareness best practices, as it is often administered to users without context and in a poorly timed manner. Furthermore, as security threats become increasingly sophisticated and organizations mature and grow, generalized training templates may not reflect the most recent advancements in an organization's security policies or systems.

Systems for delivering effective security awareness training to users of an organization may rely on multiple tools and contextual parameters, each of which may need to be adjusted to reflect different gaps in security awareness of each user. Further, manual creation and personalization of security awareness training templates may be tedious, and the training provided to the users may be inadequate for addressing an organization's security awareness needs. With the human element becoming increasingly critical to the security posture of an organization, the traditional approaches of 'one size fits all' training responses for security awareness user failures are inadequate because these traditional approaches do not adapt in real time and are not tailored to user actions or to conditions of the actions occurring. Similarly, responses, schedules for the responses, and channels that the responses are sent through may depend on actions, and conditions of those actions, as well as target for the responses.

Methodologies that are tailored to a specific set of users may not perform as desired as the overall number of users increases because the complexity of managing a large number of users consumes system resources such as processing time, network bandwidth, and storage. Also, defining and customizing approaches by an organization (for example, by a system administrator of the organization) may be time-consuming, complex, and prone to human errors. Effective security awareness workflows based on multiple dependent conditionalities are required, but may be challenging to envision and design. In examples, this challenge needs to be met by each individual organization implementing security awareness training, with usually limited or no knowledge of what has proved effective for other organizations. Currently there is no mechanism available that enables an organization to leverage the experience of other organizations when designing security awareness workflows. Therefore, systems and methods for the design of event-driven, orchestrated security awareness workflows that provides a system administrator of an organization with recommendations based upon what security awareness workflow elements and structures have proved effective in other organizations in response to different security incidents and user attributes are required.

The present disclosure describes systems and methods that enable an organization to leverage orchestration rules and security awareness workflows designed and implemented by other organizations. Orchestration rules may refer to one or more actions taken individually or in combination to act to change behavior of a user or a set of users. A security awareness workflow may be a workflow designed to improve the security posture of an organization by way of delivering responses to one or more users of the organization following one or more users' engagement in an action associated with a security risk.

Figure 2A:
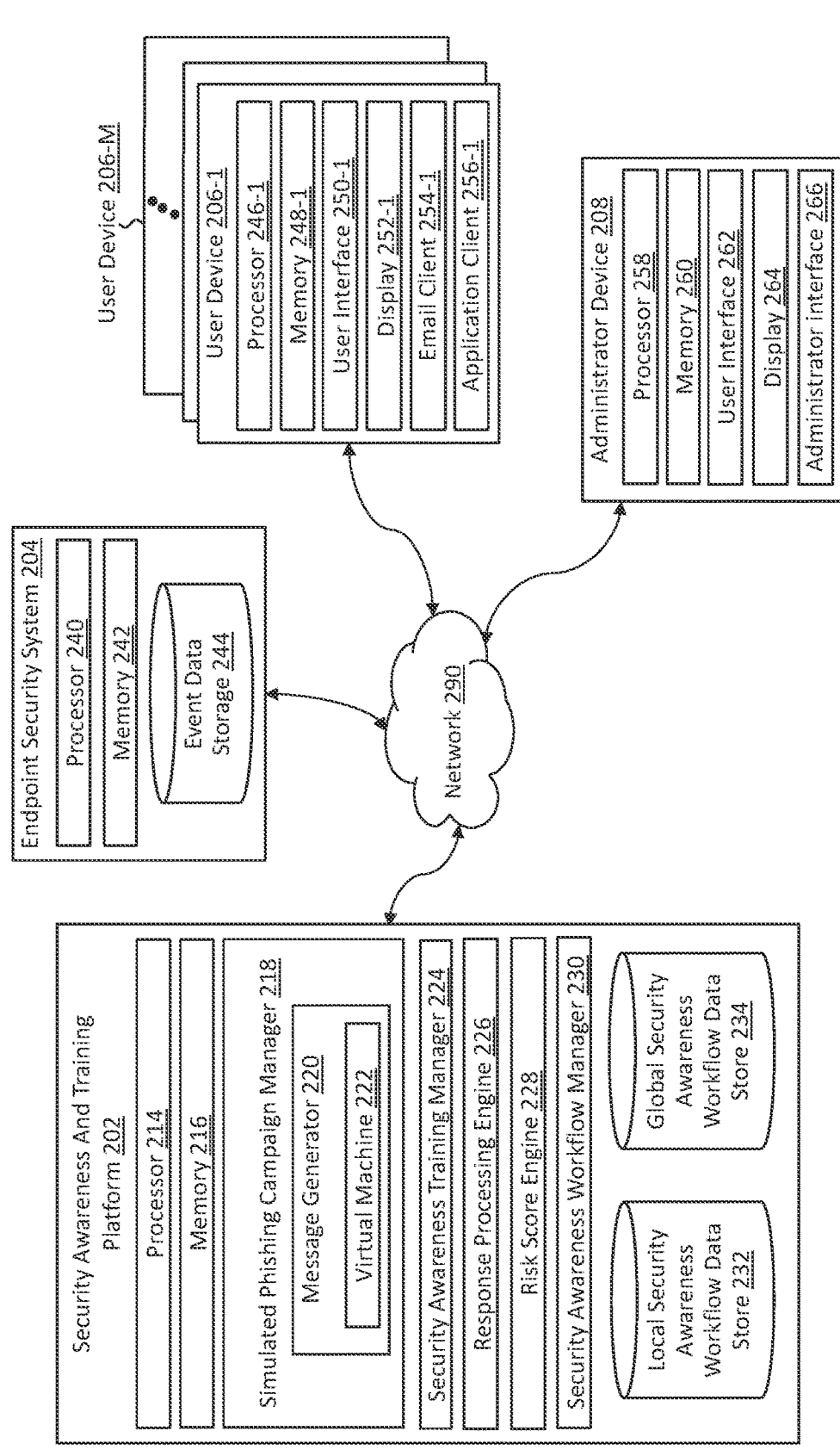

Referring to FIG. 2A and FIG. 2B, in a general overview, FIG. 2A and FIG. 2B depict some of the server architecture of an implementation of system 200 for recommendation of one or more security awareness workflows for improved cybersecurity of an organization, according to some embodiments. As shown in FIG. 2A, system 200 may include security awareness and training platform 202, endpoint security system 204, user device(s) 206-(1-M), administrator device 208, and network 290 enabling communication between the system components for information exchange. Network 290 may be an example or instance of network 104, details of which are provided with reference to FIG. 1A and its accompanying description.

According to some embodiments, security awareness and training platform 202 and endpoint security system 204 may be implemented in a variety of computing systems, such as a mainframe computer, a server, a network server, a laptop computer, a desktop computer, a notebook, a workstation, and the like. In an implementation, security awareness and training platform 202 and endpoint security system 204 may be implemented in a server, such as server 106 shown in FIG. 1A. In some implementations, security awareness and training platform 202 and endpoint security system 204 may be implemented by a device, such as computing device 100 shown in FIG. 1C and FIG. 1D. In some embodiments, each of security awareness and training platform 202 and endpoint security system 204 may be implemented as a part of a cluster of servers. In some embodiments, each of security awareness and training platform 202 and endpoint security system 204 may be implemented across a plurality of servers, thereby, tasks performed by security awareness and training platform 202 and endpoint security system 204 may be performed by the plurality of servers. These tasks may be allocated among the cluster of servers by an application, a service, a daemon, a routine, or other executable logic for task allocation. The term "application" as used herein may refer to one or more applications, services, routines, or other executable logic or instructions. Each of security awareness and training platform 202 and endpoint security system 204 may comprise a program, service, task, script, library, application, or any type and form of executable instructions or code executable on one or more processors. Security awareness and training platform 202 and endpoint security system 204 may be combined into one or more modules, applications, programs, services, tasks, scripts, libraries, applications, or executable code.

In one or more embodiments, security awareness and training platform 202 may be a system that manages items relating to cybersecurity awareness for an organization. The organization may be an entity that is subscribed to or that makes use of services provided by security awareness and training platform 202. In examples, the organization may be expanded to include all users within the organization, vendors to the organization, or partners of the organization. According to an implementation, security awareness and training platform 202 may be deployed by the organization to monitor and educate users thereby reducing cybersecurity threats to the organization. In an implementation, security awareness and training platform 202 may educate users within the organization by performing simulated phishing campaigns on the users. In an example, a user of the organization may include an individual that is tested and trained by security awareness and training platform 202. In examples, a user of the organization may include an individual that can or does receive electronic messages. For example, the user may be an employee of the organization, a partner of the organization, a member of a group, an individual who acts in any capacity of security awareness and training platform 202, such as a system administrator, or anyone associated with the organization. The system administrator may be an individual or team managing organizational cybersecurity aspects on behalf of an organization. The system administrator may oversee and manage security awareness and training platform 202 to ensure cybersecurity awareness training goals of the organization are met. For example, the system administrator may oversee Information Technology (IT) systems of the organization for configuration of system personal information use, managing simulated phishing campaigns, identification, and classification of threats within reported emails, and any other element within security awareness and training platform 202. Examples of system administrator include an IT department, a security team, a manager, or an Incident Response (IR) team. In some implementations, security awareness and training platform 202 may be owned or managed or otherwise associated with an organization or any entity authorized thereof. A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat (also referred to as an exploit) that resembles a real phishing threat. In response to user interaction with the simulated phishing attack, for example, if the user clicks on a link (i.e., a simulated phishing link), the user may be provided with security awareness training. In an example, security awareness and training platform 202 may be a Computer Based Security Awareness Training (CBSAT) system that performs security services such as performing simulated phishing attacks on a user or a set of users of the organization as a part of security awareness training.

According to an implementation, security awareness and training platform 202 may allow an organization to create one or more security awareness workflows that process one or more users' actions. The one or more security awareness workflows may be shared across other organizations. In examples, the one or more security awareness workflows may be shared across other organizations based on their effectiveness at improving security awareness. According to an implementation, the effectiveness of the one or more security awareness workflows may be measured as a function of targeted users and deploying organization(s).

According to some embodiments, security awareness and training platform 202 may include processor 214 and memory 216. For example, processor 214 and memory 216 of security awareness and training platform 202 may be CPU 121 and main memory 122, respectively as shown in FIG. 1C and FIG. 1D. Further, security awareness and training platform 202 may include simulated phishing campaign manager 218. Simulated phishing campaign manager 218 may include various functionalities that may be associated with cybersecurity awareness training. In an implementation, simulated phishing campaign manager 218 may be an application or a program that manages various aspects of a simulated phishing attack, for example, tailoring and/or executing a simulated phishing attack. A simulated phishing attack may test the readiness of a user to manage phishing attacks such that malicious actions are prevented. For instance, simulated phishing campaign manager 218 may monitor and control timing of various aspects of a simulated phishing attack including processing requests for access to attack results and performing other tasks related to the management of a simulated phishing attack.

In some embodiments, simulated phishing campaign manager 218 may include message generator 220 having virtual machine 222. Message generator 220 may be an application, service, daemon, routine, or other executable logic for generating messages. The messages generated by message generator 220 may be of any appropriate format. For example, the messages may be email messages, text messages, short message service (SMS) messages, instant messaging (IM) messages used by messaging applications such as, e.g., WhatsApp™, or any other type of message. In examples, a message type to be used in a particular simulated phishing communication may be determined by, for example, simulated phishing campaign manager 218. Message generator 220 generates messages in any appropriate manner, e.g., by running an instance of an application that generates the desired message type, such as running, e.g., a Gmail® application, Microsoft Outlook™, WhatsApp™ a text messaging application, or any other appropriate application. Message generator 220 may generate messages by running a messaging application on virtual machine 222 or in any other appropriate environment. Message generator 220 generates the messages to be in a format consistent with specific messaging platforms, for example, Outlook 365™, Outlook® Web Access (OWA), Webmail™, iOS®, Gmail®, and such formats.

In an implementation, message generator 220 may be configured to generate simulated phishing communications using a simulated phishing template. A simulated phishing template is a framework used to create simulated phishing communications. In some examples, a simulated phishing template may specify the layout and content of one or more simulated phishing communications. In an example, the simulated phishing template may include fixed content including text and images. In some examples, a simulated phishing template may be designed according to theme or subject matter. The simulated phishing template may be configurable by a system administrator. For example, the system administrator may be able to add dynamic content to the simulated phishing template, such as a field that will populate with a recipient's name and email address when message generator 220 prepares simulated phishing communications based on the simulated phishing template for sending to a user. In an example, the system administrator may be able to select one or more exploits to include in the simulated phishing template, for example, one or more simulated malicious URLs, one or more simulated macros, and/or one or more simulated attachments. An exploit is an interactable phishing tool in simulated phishing communications that can be clicked on or otherwise interacted with by a user. A simulated phishing template customized by the system administrator can be used for multiple different users in the organization over a period of time or for different campaigns. In some examples, a system administrator may select a simulated phishing template from a pool of available simulated phishing templates and may send such a "stock" template to users unchanged. The simulated phishing template may be designed to resemble a known real phishing attack such that simulated phishing communications based on the simulated phishing template may be used to train users to recognize these real attacks.

In some embodiments, security awareness and training platform 202 may include security awareness training manager 224, response processing engine 226, and risk score engine 228. In an implementation, security awareness training manager 224 may be an application or a program that includes various functionalities that may be associated with providing security awareness training to users of the organization. In an example, training material may be provided or presented to the users as a part of training. In examples, security awareness training manager 224 provides or presents the training material when the user interacts with a simulated phishing communication. In some examples, security awareness training manager 224 provides or presents training material during usual training sessions. The training material may include material to educate users of the risk of interacting with suspicious messages (communications) and train users on precautions in dealing with unknown, untrusted, and suspicious messages.

According to an implementation, security awareness training manager 224 may provide training to the users via landing pages. In an example, a landing page may be a web page element which enables provisioning of training materials. In some examples, the landing page may be a pop-up message. A pop-up message shall be understood to refer to the appearance of graphical or textual content on a display. In examples, the training material or the learning material may be presented on the display as part of, or bounded within, a "window" or a user interface element or a dialogue box. Other known examples and implementations of training materials are contemplated herein.

In an implementation, response processing engine 226 may be an application or a program that is configured to receive and process user interaction with the simulated phishing attack. The user interaction may include a user clicking a simulated phishing link, downloading attachments such as a file or a macro, opening the message, replying to the message, clicking on the message, deleting the message without reporting, reporting the message, or not taking any action on the message. If the user has clicked a simulated phishing link, downloaded attachments such as a file or a macro, deleted the message without reporting, opened the message to read the contents, replied to the message, clicked on the message, deleted the message or did not take any action on the message, response processing engine 226 may provide the user with corresponding security awareness training based on aforementioned type of the user interaction with the simulated phishing message. For user interaction that involves the user reporting the message, response processing engine 226 may share a congratulatory message and update a user maturity level of the user in the organization.

In an implementation, risk score engine 228 may be an application or a program for determining and maintaining risk scores for users in an organization. A risk score of a user may be a representation of a vulnerability of the user to a malicious attack or the likelihood that a user may engage in an action associated with a security risk. In an implementation, risk score engine 228 may maintain more than one risk score for each user. Each such risk score may represent one or more aspects of vulnerability of the user to a specific cyberattack. In an implementation, risk score engine 228 may calculate risk scores for a group of users, for the organization, for an industry (for example, an industry to which the organization belongs), a geography, and so on. In an example, a risk score of the user may be modified based on the user's responses to simulated phishing communications, completion of training by the user, a current position of the user in the organization, a size of a network of the user, an amount of time the user has held the current position in the organization, a new position of the user in the organization if the position changes, for example due to a promotion or change in department and/or any other attribute that can be associated with the user.

In an implementation, security awareness training manager 224, response processing engine 226, and risk score engine 228 among other units, may include routines, programs, objects, components, data structures, etc., which may perform particular tasks or implement particular abstract data types. In examples, security awareness training manager 224, response processing engine 226, and risk score engine 228 may also be implemented as signal processor(s), state machine(s), logic circuitries, and/or any other device or component that manipulate signals based on operational instructions.

In some embodiments, security awareness training manager 224, response processing engine 226, and risk score engine 228 may be implemented in hardware, instructions executed by a processing module, or by a combination thereof. In examples, the processing module may be central processing unit 121, as shown in FIG. 1D. The processing module may comprise a computer, a processor, a state machine, a logic array, or any other suitable devices capable of processing instructions. The processing module may be a general-purpose processor which executes instructions to cause the general-purpose processor to perform the required tasks or the processing module may be dedicated to performing the required functions. In some embodiments, security awareness training manager 224, response processing engine 226, and risk score engine 228 may be machine-readable instructions which, when executed by a processor/processing module, perform intended functionalities of security awareness training manager 224, response processing engine 226, and risk score engine 228. The machine-readable instructions may be stored on an electronic memory device, hard disk, optical disk, or other machine-readable storage medium or non-transitory medium. In an implementation, the machine-readable instructions may also be downloaded to the storage medium via a network connection.

In some embodiments, security awareness and training platform 202 may include security awareness workflow manager 230. In an implementation, security awareness workflow manager 230 may be an application or a program that includes various functionalities that may be associated with creation of one or more security awareness workflows and deployment of the one or more security awareness workflows. A workflow may refer to a series of activities that execute in a particular order to achieve a process or a task. In an example, a workflow may be created to deliver responses to one or more users based on insecure activities of the one or more users. Further, a security awareness workflow may be a workflow that is designed to improve the security posture of an organization by way of delivering responses to one or more users of the organization following the one or more users' engagement in an action associated with a security risk. In an implementation, security awareness workflow manager 230 may be an application or a program that manages various aspects of security awareness workflows or that creates various aspects of security awareness workflows.

Further, in some embodiments, security awareness and training platform 202 may include local security awareness workflow data store 232 and global security awareness workflow data store 234. In an implementation, local security awareness workflow data store 232 may store one or more security awareness workflows and data associated with one or more security awareness workflows. In an example, the one or more security awareness workflows may be accessible only to an organization that implements local security awareness workflow data store 232.

In an implementation, global security awareness workflow data store 234 may store one or more security awareness workflows that are determined to be effective by some measure. The one or more security awareness workflows stored in global security awareness workflow data store 234 may be accessible to all organizations that have access to global security awareness workflow data store 234. According to implementations, each of local security awareness workflow data store 232 and global security awareness workflow data store 234 may be implemented by a database, by a data lake, or by another means of storing data. In examples, one or more security awareness workflows stored in local security awareness workflow data store 232 and one or more security awareness workflows stored in global security awareness workflow data store 234 may be periodically or dynamically updated as required.

According to an embodiment, endpoint security system 204 may be a system (or one or more systems) that is implemented by an organization to monitor nodes or endpoints of the network that are closest to an end user device, for example for compliance with security standards. An 'endpoint' is any device that is physically an end point on a computer network. Examples of endpoints are laptops, desktop computers, mobile phones, tablet devices, servers, and virtual environments. Examples of endpoint security services provided by an endpoint security system include antivirus software, email filtering, web filtering, and firewall services. In an example, endpoint security system 204 may also provide protection from cybersecurity threats posed by lack of compliance with security standards on the endpoints. In an implementation, endpoint security system 204 may include a secure email gateway or other system deployed by an organization. In an example, endpoint security system 204 may be a third-party system. In an implementation, endpoint security system 204 may operate to protect the organization by detecting, intercepting, or recording risky actions of users of the organization. In an implementation, endpoint security system 204 may be configured to block or record user actions that may expose the organization to risk or that may violate the policies or rules of the organization. Examples of activities that endpoint security system 204 may block or record include network traffic going to Uniform Resource Locators (URLs) that are not allowed (i.e., that are blacklisted), peer to peer traffic connecting to certain ports, user access to an insecure File Transfer Protocol (FTP) server, a direct terminal connection with unencrypted traffic (for example, with telnet), use of unencrypted protocols (for example, http://) when encrypted protocols (for example, https://) are available, violation of company security policies (for example, the use of thumb drives or use of certain file extensions), execution of unsigned code, execution of code downloaded from the Internet, and traffic from non-secure networks (for example, not using a Virtual Private Network (VPN) to connect to devices). Known examples of endpoint security system 204 include CrowdStrike™ Falcon (Austin, Texas), Palo Alto Networks (Santa Clara, California), NetSkope NewEdge (Santa Clara, California), Zscaler (San Jose, California), SentinelOne Singularity Platform (Mountainview, California), Kaspersky Endpoint Security (Moscow, Russia), or Broadcom Symantec Endpoint Protection (San Jose, California).

According to some embodiments, endpoint security system 204 may include processor 240 and memory 242. For example, processor 240 and memory 242 of endpoint security system 204 may be CPU 121 and main memory 122, respectively as shown in FIG. 1C and FIG. 1D. In some embodiments, endpoint security system 204 may include event data storage 244. In an implementation, event data storage 244 may store event data of users in an organization. In examples, event data storage 244 may store user actions that may expose an organization to risk or that may violate policies or rules of the organization. In some implementations, event data storage 244 may store information related to security incidents. A security incident is an incident within an organization that affects a user which is related to the security domain of the organization. Examples of security incidents include unauthorized attempts to access systems or data, privilege escalation attacks, phishing attacks, malware attacks, Denial-of-Service (DoS) attacks, man-in-the-middle attacks, and password attacks. In an implementation, information stored in event data storage 244 may be periodically or dynamically updated as required. According to an implementation, event data storage 244 may include any type or form of storage, such as a database or a file system or coupled to memory 242.

Referring again to FIG. 2A, in some embodiments, user device 206-(1-M) may be any IT device used by a user (all devices of user device 206-(1-M) are subsequently referred to as user device 206-1 but the description may be generalized to any of user device 206-(1-M)). The user may be an employee of an organization, a client, a vendor, a customer, a contractor, a system administrator, or any person associated with the organization. User device 206-1 may be any computing device, such as a desktop computer, a laptop, a tablet computer, a mobile device, a Personal Digital Assistant (PDA), or any other computing device. In an implementation, user device 206-1 may be a device, such as client device 102 shown in FIG. 1A and FIG. 1B. User device 206-1 may be implemented by a device, such as computing device 100 shown in FIG. 1C and FIG. 1D. According to some embodiments, user device 206-1 may include processor 246-1 and memory 248-1. In an example, processor 246-1 and memory 248-1 of user device 206-1 may be CPU 121 and main memory 122, respectively, as shown in FIG. 1C and FIG. 1D. User device 206-1 may also include user interface 250-1, such as a keyboard, a mouse, a touch screen, a haptic sensor, a voice-based input unit, or any other appropriate user interface. It shall be appreciated that such components of user device 206-1 may correspond to similar components of computing device 100 in FIG. 1C and FIG. 1D, such as keyboard 126, pointing device 127, I/O devices 130a-n and display devices 124a-n. User device 206-1 may also include display 252-1, such as a screen, a monitor connected to the device in any manner, or any other appropriate display, which may correspond to similar components of computing device 100, for example display devices 124a-n. In an implementation, user device 206-1 may display received content (for example, a simulated phishing communication based on a simulated phishing template) for the user using display 252-1 and is able to accept user interaction via user interface 250-1 responsive to the displayed content.

Referring again to FIG. 2A, in some embodiments, user device 206-1 may include email client 254-1 and application client 256-1. In one example, email client 254-1 may be a cloud-based application that can be accessed over network 290 without being installed on user device 206-1. In an implementation, email client 254-1 may be any application capable of composing, sending, receiving, and reading email messages. In an example, email client 254-1 may facilitate a user to create, receive, organize, and otherwise manage email messages. In an implementation, email client 254-1 may be an application that runs on user device 206-1. In some implementations, email client 254-1 may be an application that runs on a remote server or on a cloud implementation and is accessed by a web browser. For example, email client 254-1 may be an instance of an application that allows viewing of a desired message type, such as any web browser, Microsoft Outlook™ application (Microsoft, Mountain View, California), IBM® Lotus Notes® application, Apple® Mail application, Gmail® application (Google, Mountain View, California), WhatsApp™ (Facebook, Menlo Park, California), a text messaging application, or any other known or custom email application. In an example, a user of user device 206-1 may be mandated to download and install email client 254-1 on user device 206-1 by the organization. In an example, email client 254-1 may be provided by the organization as default. In some examples, a user of user device 206-1 may select, purchase and/or download email client 254-1 through an application distribution platform. In some examples, user device 206-1 may receive simulated phishing communications via email client 254-1. User device 206-1 may also include application client 256-1. In an implementation, application client 256-1 may be a client side program or a client side application that is run on user device 206-1. In examples, application client 256-1 may be a desktop application, mobile application, etc. Other user devices 206-(2-M) may be similar to user device 206-1.

Referring back to FIG. 2A, in some embodiments, administrator device 208 may be any device used by a system administrator to perform administrative duties. Administrator device 208 may be any computing device, such as a desktop computer, a laptop, a tablet computer, a mobile device, a Personal Digital Assistant (PDA), smart glasses, or any other computing device. In an implementation, administrator device 208 may be a device, such as client device 102 shown in FIG. 1A and FIG. 1B. Administrator device 208 may be implemented by a device, such as computing device 100 shown in FIG. 1C and FIG. 1D. According to some embodiments, administrator device 208 may include processor 258 and memory 260. In an example, processor 258 and memory 260 of administrator device 208 may be CPU 121 and main memory 122, respectively, as shown in FIG. 1C and FIG. 1D. Administrator device 208 may also include user interface 262, such as a keyboard, a mouse, a touch screen, a haptic sensor, a voice-based input unit, or any other appropriate user interface. It shall be appreciated that such components of administrator device 208 may correspond to similar components of computing device 100 in FIG. 1C and FIG. 1D, such as keyboard 126, pointing device 127, I/O devices 130a-n and display devices 124a-n. Administrator device 208 may also include display 264, such as a screen, a monitor connected to the device in any manner, a wearable glass, or any other appropriate display. In some implementations, administrator device 208 may include administrator interface 266. Administrator interface

266 may be supported by a library, an application programming interface (API), a set of scripts, or any other code that may enable the system administrator to manage security awareness and training platform 202.

FIG. 2B illustrates various components of security awareness workflow manager 230. According to an implementation, security awareness workflow manager 230 includes security awareness workflow interpreter 270, security awareness workflow editor 272, security awareness workflow deployment engine 274, security awareness workflow assessment engine 276, metrics editor 278, security awareness workflow recommendation engine 280, security awareness workflow adjustment engine 282, goals-based requirement engine 284, and reporting engine 286.

In an implementation, security awareness workflow manager 230, security awareness workflow interpreter 270, security awareness workflow editor 272, security awareness workflow deployment engine 274, security awareness workflow assessment engine 276, metrics editor 278, security awareness workflow recommendation engine 280, security awareness workflow adjustment engine 282, goals-based requirement engine 284, and reporting engine 286 among other units, may include routines, programs, objects, components, data structures, etc., which may perform particular tasks or implement particular abstract data types. In examples, security awareness workflow manager 230, security awareness workflow interpreter 270, security awareness workflow editor 272, security awareness workflow deployment engine 274, security awareness workflow assessment engine 276, metrics editor 278, security awareness workflow recommendation engine 280, security awareness workflow adjustment engine 282, goals-based requirement engine 284, and reporting engine 286 may also be implemented as signal processor(s), state machine(s), logic circuitries, and/or any other device or component that manipulate signals based on operational instructions.

In some embodiments, security awareness workflow manager 230, security awareness workflow interpreter 270, security awareness workflow editor 272, security awareness workflow deployment engine 274, security awareness workflow assessment engine 276, metrics editor 278, security awareness workflow recommendation engine 280, security awareness workflow adjustment engine 282, goals-based requirement engine 284, and reporting engine 286 may be implemented in hardware, instructions executed by a processing module, or by a combination thereof. In examples, the processing module may be central processing unit 121, as shown in FIG. 1D. The processing module may comprise a computer, a processor, a state machine, a logic array, or any other suitable devices capable of processing instructions. The processing module may be a general-purpose processor which executes instructions to cause the general-purpose processor to perform the required tasks or the processing module may be dedicated to performing the required functions. In some embodiments, security awareness workflow manager 230, security awareness workflow interpreter 270, security awareness workflow editor 272, security awareness workflow deployment engine 274, security awareness workflow assessment engine 276, metrics editor 278, security awareness workflow recommendation engine 280, security awareness workflow adjustment engine 282, goals-based requirement engine 284, and reporting engine 286 may be machine-readable instructions which, when executed by a processor/processing module, perform intended functionalities of security awareness workflow manager 230, security awareness workflow interpreter 270, security awareness workflow editor 272, security awareness workflow deployment engine 274, security awareness workflow assessment engine 276, metrics editor 278, security awareness workflow recommendation engine 280, security awareness workflow adjustment engine 282, goals-based requirement engine 284, and reporting engine 286. The machine-readable instructions may be stored on an electronic memory device, hard disk, optical disk, or other machine-readable storage medium or non-transitory medium. In an implementation, the machine-readable instructions may also be downloaded to the storage medium via a network connection.

According to aspects of the present disclosure, a security awareness workflow may be a series of dependent events which facilitate, in response to one or more users of an organization engaging in an action associated with a security threat, the delivery of one or more remedial responses to the one or more users.

Figure 3:
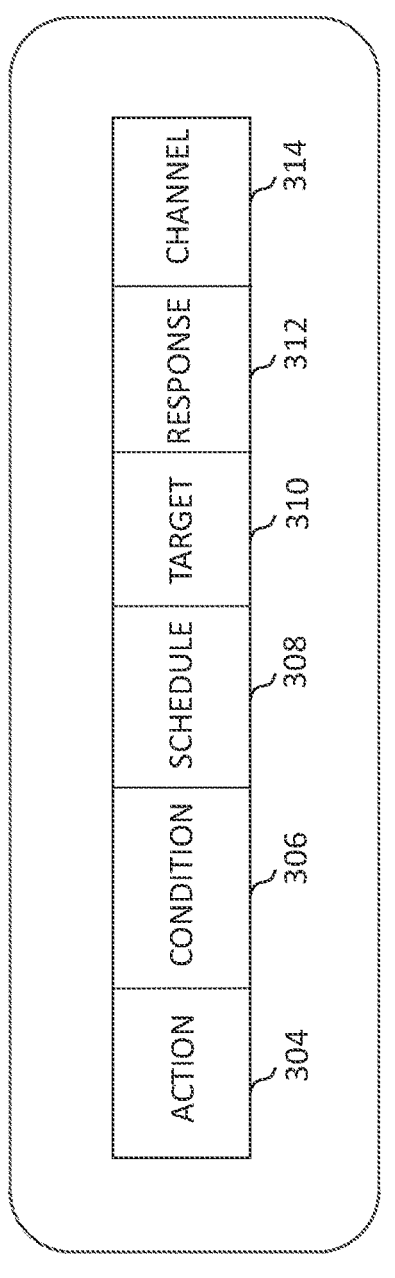
FIG. 3 illustrates an example structure of a security awareness workflow, according to some embodiments.

FIG. 3 illustrates example structure 300 of a security awareness workflow, according to some embodiments.

As described in FIG. 3, the security awareness workflow may include action element 304, condition element 306, schedule element 308, target element 310, response element 312, and channel element 314. In examples, action element 304 may represent behavior of a user of an organization that may be tracked or that, in examples, poses a security risk to the organization, and therefore may trigger execution of the security awareness workflow. Examples of actions include, but are not limited to, "clicked phishing link", "inserted USB drive", and "visited http://' 'Visited Pirated Site'".

In examples, condition element 306 may represent criteria applied to an action of a user, whereby fulfillment of the criteria described by condition element 306 may be required for the action to trigger the security awareness workflow. A criteria applied to an action may be referred to as action criteria. In examples, the action criteria may relate to frequency, date and time of the action, attributes of a user, or outcomes of past security awareness workflows. Examples of conditions include, but are not limited, to "number of occurrences (#) of specific action—no time limit", "number of occurrences (#) of any action—no time limit", "number of occurrences (#) of specific action—before date/time", "number of occurrences (#) of any action—before date/time", "number of occurrences (#) of specific action—within time period", "number of occurrences (#) of any action—within time period", "number of occurrences (#) of past security awareness workflow conditions", "user risk/security score above threshold", and "user risk/security score below threshold".

In examples, schedule element 308 may specify a timing and/or a periodicity for delivery of one or more responses to a target of the security awareness workflow, as a result of an action fulfilling a condition. Examples of schedules for the delivery of responses include, but are not limited to, "immediate", "end of day", "end of week", "daily", "monthly", "start of day after action", "start of week after action", and "custom schedule".

In examples, target element 310 may refer to a single user or multiple users of an organization to which a response of the security awareness workflow may be delivered. Examples of targets include, but are not limited to, "user", "user's manager", "user's organization unit", "selected users", "all direct reports of user's manager", "all employees at user's location", "all employees at user's seniority", and "all employees".

In examples, response element 312 may refer to the outcome of the security awareness workflow. For example, a response of the security awareness workflow may be the delivery of security awareness training to a user (or a target), or updating of user permissions of that user. Examples of responses include, but are not limited to, "training module", "update risk/security score", "add to restricted group", "HR visit", "send notification", "lecture", "block access", "simulated phishing attack", and "intervention".

In examples, channel element 314 may refer to a medium through which a response is delivered to a user (target). Examples of channels include, but are not limited "Slack", "email", "voice call", "text message", "pop up", "announcement", "poster", "video", and "Microsoft Teams".

In examples, any aspect of a security awareness workflow may be defined in a general sense as well as a specific sense. For example, an action element, a condition element, and a response element of a security awareness workflow may be defined in a general sense. In an example, a requirement of a security awareness workflow which is defined in a general sense may be referred to as a general requirement, and a requirement of a security awareness workflow which is defined in a specific sense may be referred to as a specific requirement. In an example, a general requirement may be where absolute action criteria and thresholds are not provided to a security awareness workflow but a more general description (for example, a trend such as "increasing" or a bracket such as "high") is provided.

According to an implementation, security awareness workflow interpreter 270 may be configured to process a general requirement for a security awareness workflow. In an implementation, security awareness workflow interpreter 270 may translate the general requirement into one or more specific requirements that may be actioned by security awareness and training platform 202. According to an implementation, security awareness workflow interpreter 270 may include or be realized by an artificial intelligence (AI) or machine learning (ML) module. In some implementations, security awareness workflow interpreter 270 may receive a mapping between a general requirement and one or more specific requirements from a system administrator or any knowledgeable user of security awareness and training platform 202. In examples, the mapping may be made prior to being presented as an available configuration option. In some examples, security awareness workflow interpreter 270 may send a request for the mapping between the general requirement and the one or more specific requirements to the system administrator or any knowledgeable user of security awareness and training platform 202. Examples of general requirements include, but are not limited to "move a user from a safe-user-policy to a medium-risk-user-policy" and "when clicks of users on a link are high". In an example, a user-policy may be a configuration of one or more organizational platforms which may be specific to a user. In examples, the user-policy may control access that the user has to the organizational platforms and permissions on what actions(s) the user may take.

According to an implementation, security awareness workflow editor 272 may be configured to create one or more security awareness workflows under the control of an organization. In examples, security awareness workflow editor 272 may be a workflow designer workspace. In examples, the one or more security awareness workflows may include one or more actions and one or more conditions to trigger the one or more actions. In examples, the one or more conditions may include one or more action criteria applied to the one or more actions of the one or more users. In an implementation, security awareness workflow editor 272 may store the one or more security awareness workflows in local security awareness workflow data store 232. In examples, the one or more security awareness workflows may be accessible only to the organization that implements local security awareness workflow data store 232.

In examples, the one or more security awareness workflows may be stored in local security awareness workflow data store 232 until it has been determined that the one or more security awareness workflows are effective within the organization. In an example, if a security awareness workflow is determined to be effective then the security awareness workflow may be copied or moved from local security awareness workflow data store 232 to global security awareness workflow data store 234 from where the security awareness workflow may be accessed by all organizations which have access to global security awareness workflow data store 234. Examples by which the effectiveness of the one or more security awareness workflows is determined are explained later in the description.

According to an implementation, security awareness and training platform 202 may interface with an organization's software platforms and other systems, such as Office 365, okta, Workday, Slack, etc. as inputs or outputs to enable the execution of the one or more security awareness workflows. In examples, the organization's software platforms and other systems may be collectively referred to as organizational platforms.

Figure 4:
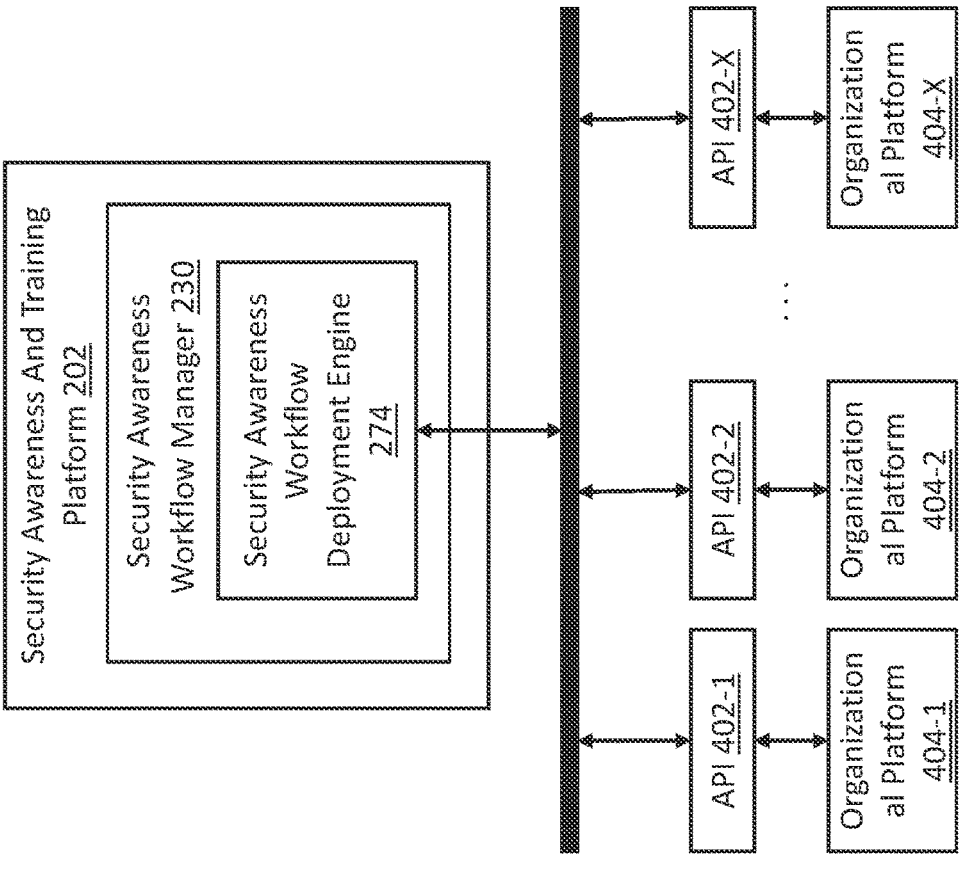
FIG. 4 illustrates an example of implementation of third-party and external systems interfaces by a security awareness and training platform, according to some embodiments.

FIG. 4 illustrates example 400 of implementation of third-party and external systems interfaces by security awareness and training platform 202, according to some embodiments.

In the example described in FIG. 4, the third-party and external systems interfaces may be via one or more application programming interfaces (APIs) 402-(1-X). In an example, an API may be a means of communication between a software platform (for example, an organizational platform) and other software platforms. The API may be implemented by software and may provide a well-defined, abstracted interface to the software platform. In examples, APIs 402-(1-X) may be implemented and provided by providers of organizational platforms 404-(1-X). In an example, an organizational platform may be a software platform or other system that an organization deploys to support its operations. Examples of organizational platforms include, but are not limited to, KnowBe4 KMSAT, Microsoft Office 365, Crowdstrike Falcon, and Zscaler Zero Trust Exchange. In examples, APIs 402-(1-X) may be implemented as a part of security awareness and training platform 202. In some examples, security awareness workflow editor 272 may provide abstractions to organizational platforms 404-(1-X), meaning that a system administrator may not need detailed insight into organizational platforms 404-(1-X) which may be used by the one or more security awareness workflows created by security awareness workflow editor 272.

According to an implementation, security awareness workflow deployment engine 274 may be configured to deploy the one or more security awareness workflows created by security awareness workflow editor 272 within the organization. In examples, the one or more security awareness workflows may deliver one or more remedial responses to one or more users in response to detection of one or more actions of the one or more users. In an implementation, security awareness workflow deployment engine 274 may execute and manage the one or more security awareness workflows. According to an implementation, security awareness workflow deployment engine 274 may store the one or more security awareness workflows deployed within the organization in local security awareness workflow data store 232. In an implementation, security awareness workflow deployment engine 274 may also store outcomes due to the execution of the one or more security awareness workflows in local security awareness workflow data store 232.

In an implementation, security awareness workflow assessment engine 276 may be configured to assess an effectiveness of the one or more security awareness workflows deployed within the organization. According to an implementation, security awareness workflow assessment engine 276 may be configured to determine one or more effectiveness metrics for the one or more security awareness workflows based at least on the assessment. In examples, the one or more effectiveness metrics may represent the effectiveness of the one or more security awareness workflows.

In examples, the one or more effectiveness metrics may include a combination of: one or more effectiveness criteria, changes in the one or more effectiveness criteria, one or more thresholds applied to the one or more effectiveness criteria, or the one or more thresholds applied to the changes in the one or more effectiveness criteria. The one or more effectiveness criteria, changes in the one or more effectiveness criteria, one or more thresholds applied to the one or more effectiveness criteria, and the one or more thresholds applied to the changes in the one or more effectiveness criteria may be termed as components of an effectiveness metric.

In an implementation, security awareness workflow assessment engine 276 may be configured to determine the one or more effectiveness criteria which may be used to measure outcomes due to the execution of the one or more security awareness workflows. In examples, for a security awareness workflow, an effectiveness criteria may be specified in terms of dependent events that facilitate the delivery of remedial responses to one or more users. In an example, an effectiveness criteria may be an action that a user takes in response to receiving a security threat or a simulated security threat. In some examples, an effectiveness criteria may be a combination of an action and a time scale or a combination of multiple actions (for example, a user clicks on a link in a simulated phishing communication immediately after receiving the simulated phishing communication, or a user clicks on a link in a simulated phishing communication after receiving a reminder message).

In some examples, an effectiveness criteria may be specified in terms of other factors, such as, a risk score. In examples, a risk score may change due to a user's interaction with a simulated phishing communication and the risk score may be used as an effectiveness criteria to determine the effectiveness of the simulated phishing communication. In some examples, an effectiveness criteria may be affected by one or more user attributes and one or more organizational attributes.

According to an implementation, security awareness workflow assessment engine 276 may classify users that are subject to the one or more security awareness workflows by one or more user attributes. Examples of the one or more user attributes include, but are not limited to, department of the organization, seniority, job title, manager, and length of tenure at organization. In examples, the target of a security awareness workflow may be all users with the one or more user attributes associated to them. In an implementation, security awareness workflow assessment engine 276 may classify the organization that deployed the one or more security awareness workflows by one or more organizational attributes. Examples of organizational attributes include, but are not limited to, sector, location, number of users, and structure (for example, matrix managed, flat structure, remote and distributed). As described earlier, outcomes due to the execution (or deployment) of the one or more security awareness workflows may be stored in local security awareness workflow data store 232. In examples, outcomes due to the execution (or deployment) of the one or more security awareness workflows may be described by one or more effectiveness criteria, one or more user attributes, and one or more organizational attributes. In some implementations, security awareness workflow assessment engine 276 may store a history of values (data) of the one or more effectiveness criteria, the one or more user attributes, and the one or more organizational attributes in local security awareness workflow data store 232. In some implementations, security awareness workflow assessment engine 276 may store a reference time at which data is valid in local security awareness workflow data store 232. In examples, history and reference time of data may allow derivatives of data such as rate of change, maxima, minima, inflection points, etc., to be determined. In an example, history of data may allow statistical analysis of data such as measure of central tendency, variation, and distribution, and reference time of data may allow trend analysis of data.

As described earlier, the one or more effectiveness metrics may include a combination of one or more effectiveness criteria, changes in the one or more effectiveness criteria, one or more thresholds applied to the one or more effectiveness criteria, or the one or more thresholds applied to the changes in the one or more effectiveness criteria. The one or more effectiveness criteria, changes in the one or more effectiveness criteria, one or more thresholds applied to the one or more effectiveness criteria, and the one or more thresholds applied to the changes in the one or more effectiveness criteria may be termed as components of an effectiveness metric.

According to an implementation, security awareness workflow assessment engine 276 may apply an operation of normalization to an effectiveness metric. In some implementations, security awareness workflow assessment engine 276 may apply a weighting factor to each of the components of the effectiveness metric before the components are combined.

A generalized example of an effectiveness metric ($m_n$) is shown in Equation (1) provided below.

$$m_n = \frac{1}{i}\sum_i \alpha_i c_i + \frac{1}{j}\sum_j \alpha_j \frac{d}{dt} c_j \tag{1}$$

where $c_i$ and $c_j$ are ith and jth effectiveness criteria, and $\alpha_i$ and $\alpha_j$ are respective weighting factors.

An example of a Boolean effectiveness metric may be shown in Equation (2) provided below.

$$m_n = (c_1 > t_1) \wedge (c_2 > t_2) \wedge \ldots \wedge (c_i > t_i) \tag{2}$$

In this example, all effectiveness criteria, $\{c_1, \ldots, c_i\}$, may exceed a threshold, $\{t_1, \ldots, t_i\}$, for the effectiveness metric to be logically true.

In example, any example of an effectiveness metric may be applied to a subset of users of an organization based on one or more user attributes and/or one or more organizations attributes. This is shown in Equation (3) below.

$$m_n|_{u \in \{a\}} = \left(\frac{1}{i}\sum_i \alpha_i c_i + \frac{1}{j}\sum_j \alpha_j \frac{d}{dt} c_j\right)\Big|_{u \in \{a\}} \tag{3}$$

where $m_{n|u \in \{a\}}$ represents the effectiveness metric, $m_n$, where the users have an user attribute, a.

According to some implementations, the one or more effectiveness metrics may include a count of occurrences of the one or more actions of the one or more users that pose a security risk to an organization and that may trigger the one or more security awareness workflows. In examples, an effectiveness metric may be defined for an entire organization or may be broken into subsets based upon attributes of the one or more users that perform the one or more actions. An improvement to this effectiveness metric may be seen as a reduction in the count.

According to some implementations, the one or more effectiveness metrics may include a count of the one or more users clicking on a link in a simulated phishing communication, where the one or more users are based at least on one or more user attributes. An example of an effectiveness metric that includes one or more user attributes may be a count of users clicking on a link in a simulated phishing communication where the users are based in a software development department of the organization. Another example of the effectiveness metric may include a count of users clicking on a link in a simulated phishing communication where the users are based in a finance department of the organization.

According to some implementations, one or more effectiveness metrics may be defined by a system administrator. In an implementation, the system administrator may define the one or more effectiveness metrics using metrics editor 278. In an example, metrics editor 278 may be a "what you see is what you get" (WYSIWYG) style editor and may be implanted by a Web application. In an example, components of an effectiveness metric (for example, effectiveness criteria $\{c_1, \ldots, c_i\}$, threshold $\{t_1, \ldots, t_i\}$, and weighting factor $\{\alpha_1, \ldots, \alpha_i\}$ as shown in Equations (1)-(3)) may be represented as drag-and-drop elements, or as configuration elements which may be added from a menu. In an example, metrics editor 278 may be a text editor. In examples, the one or more effectiveness metrics may be defined in a text-based language such as extensible markup language (XML) or JavaScript object notation (JSON).

According to an implementation, security awareness workflow assessment engine 276 may determine an effectiveness score (E) of the one or more security awareness workflows for a group of one or more users based at least on the one or more effectiveness metrics. In an implementation, security awareness workflow assessment engine 276 may determine an action reduction threshold (A) for a number of occurrences of the one or more actions of the one or more users within a time period (P). In an implementation, security awareness workflow assessment engine 276 may determine a classification of effectiveness of the one or more security awareness workflows by calculating a residual between the action reduction threshold and the effectiveness score of the one or more security awareness workflows.

In examples, a security awareness workflow may be effective for a purpose for which it is designed. An effectiveness metric may be designed to measure this effect. According to an implementation, security awareness workflow assessment engine 276 may determine the effectiveness of a security awareness workflow by comparing effectiveness metrics of one or more security awareness workflows.

According to an implementation, security awareness workflow assessment engine 276 may categorize the one or more security awareness workflows by an action that triggered the one or more security awareness workflows, by organizational attributes, and by user attributes of the users that have been subject to the one or more security awareness workflows. In an implementation, security awareness workflow assessment engine 276 may classify the effectiveness of the one or more security awareness workflows by the reduction in occurrences of the action after the implementation of the one or more security awareness workflows and the time taken to achieve a specified reduction in occurrences of that action. In examples, categorization of the one or more security awareness workflows and classification of the effectiveness of the one or more security awareness workflows may be generalized as an effectiveness score (E) measured against an action reduction threshold (A) for the number of occurrences of an action within a time period (P). In examples, the effectiveness score may be defined for an entire organization in aggregate (for example, for all users of an organization), or may be defined for subsets or groups of users based upon user attributes of the users who have been subject to the one or more security awareness workflows.

In an implementation, security awareness workflow assessment engine 276 may calculate an effectiveness score (E) as a weighted combination of one or more effectiveness metrics. In an example, the weighting for each effectiveness metric may be equal and unity (i.e., equal weighting, or no weighting). To allow for comparison of effectiveness scores, the effectiveness score calculated by security awareness workflow assessment engine 276 may be normalized based on the number of effectiveness metrics which make up the efffectiveness score. The calculation is shown in Equation (4) below.

$$E = \frac{1}{k}\sum\nolimits_{k} w_k m_k \qquad (4)$$

where, $w_k$ is a weighting factor for the kth metric, $m_k$.

In examples, where there is a time period (P) defined, then an effectiveness score (E) may be mathematically expressed as:

$$E = \frac{1}{Pk}\sum\nolimits_{t=0}^{P}\sum\nolimits_{k} w_k m_k \qquad (5)$$

Based on Equation (4) and Equation (5), an action reduction threshold (A) may be defined and classification of the effectiveness of a security awareness workflow may be determined by calculating a residual ($R_E$) between the action reduction threshold (A) and the effectiveness score (E) of the security awareness workflow. This is shown in Equation (6) below.

$$R_E = E - A \qquad (6)$$

In an example, a security awareness workflow may be determined to be effective at reducing the occurrences of users clicking on a phishing link for users based in a software development department of the organization. Further, the same security awareness workflow may be determined to be less effective at reducing the occurrences of users clicking on a phishing link for users based in a finance team of the organization.

According to some examples, a security awareness workflow determined to be effective in one type of organization may be determined to be less effective in another type of organization. In examples, the effectiveness of a security awareness workflow may vary from country to country. For example, a security awareness workflow determined to be effective for organizations in one country may be determined to be less effective for organizations in another country. In some examples, the effectiveness of a security awareness workflow may vary depending on the size of the organization and the sector in which the organization operates. In examples, effectiveness of one or more security awareness workflows may be grouped by any attribute of an organization, or of groups of users in one or more organizations. Further, in some examples, one security awareness workflow (referred to as a first security awareness workflow) may be successful in reducing the occurrences of a particular action, however another security awareness workflow (referred to as a second security awareness workflow) may be successful in reducing the occurrences of the particular action in a shorter time frame or by a greater amount. In this case, the second security awareness workflow may be classified as more effective than the first security awareness workflow.

According to an implementation, for each security awareness workflow, security awareness workflow assessment engine 276 may store the effectiveness score, organizational attributes of the organization from which the security awareness workflow originated, and user attributes of the users that have been subject to the security awareness workflow in local security awareness workflow data store 232. In examples, the effectiveness score, the organizational attributes, and the user attributes may be stored in a record along with the security awareness workflow in local security awareness workflow data store 232.

According to an implementation, upon determining that a security awareness workflow stored in local security awareness workflow data store 232 is effective, security awareness workflow assessment engine 276 may copy or move the security awareness workflow to global security awareness workflow data store 234. In an implementation, security awareness workflow assessment engine 276 may compare an effectiveness score of a security awareness workflow with a threshold value to determine if the security awareness workflow is effective. In an example, the threshold value may be provided as a global parameter in security awareness and training platform 202. In examples, if the effectiveness score of the security awareness workflow exceeds the threshold value, the security awareness workflow may be determined to be effective.

In an implementation, security awareness workflow recommendation engine 280 may identify a recommendation of one or more security awareness workflow configurations based at least on the one or more effectiveness metrics. In examples, the recommendation may include identification of one or more security awareness workflow configurations from other organizations. According to an implementation, security awareness workflow recommendation engine 280 may display the recommendation of the one or more security awareness workflow configurations including a selection of one or more components of the one or more security awareness workflows to use in the one or more security awareness workflow configurations to a system administrator via an interface (for example, administrator interface 266 or user interface 262).

In some implementations, security awareness workflow recommendation engine 280 may display the recommendation of the one or more security awareness workflow configurations including the one or more security awareness workflows with a highest effectiveness score based at least on the one or more effectiveness metrics to a system administrator via an interface (for example, administrator interface 266 or user interface 262). According to an implementation, security awareness workflow recommendation engine 280 may provide the system administrator with recommendations for appropriate security awareness workflow configurations based upon what has proven effective in other organizations in response to specific security incidents (actions).

In examples, when designing a security awareness workflow, the system administrator may specify an action that is present in an organization and known to constitute a security threat. The system administrator may also specify the users that he or she wants to target. In examples, the users may be specified via user attributes or via organizational attributes. In response, security awareness workflow recommendation engine 280 may identify one or more security awareness workflows that are effective for handling the action specified by the system administrator. In an implementation, security awareness workflow recommendation engine 280 may identify the one or more security awareness workflows based on their effectiveness scores. In an example, security awareness workflow recommendation engine 280 may identify a security awareness workflow with a highest effectiveness score and display (or present) the security awareness workflow to the system administrator. In some examples, security awareness workflow recommendation engine 280 may identify the security awareness workflows with the highest effectiveness scores (e.g., a top three) and display these security awareness workflows to the system administrator.

In some examples, the system administrator may identify user attributes that have been associated with occurrences of an action that is known to constitute a security threat. In examples, users may be identified by user attributes or by organizational attributes. In an implementation, the system administrator may request security awareness workflow recommendation engine 280 to recommend security awareness workflows only where one or more user attributes or one or more organizational attributes closely match. In examples, the system administrator may configure a threshold that determines how closely a recommended security awareness workflow is aligned to the user attributes and organizational attributes. According to an implementations, security awareness workflow recommendation engine 280 may recommend one or more security awareness workflows based on the threshold. In some examples, the system administrator may select one or more of conditions, schedules, targets, responses, and channels of a security awareness workflow. The system administrator may request security awareness workflow recommendation engine 280 to make recommendations for any components of the security awareness workflow.

According to an implementation, the system administrator of the organization may designate design control of one or more security awareness workflows to goals-based requirement engine 284 which may be an AI-enabled agent. In an implementation, goals-based requirement engine 28 may be configured to take actions on behalf of the system administrator. In some implementations, the system administrator may be enabled to provide one or more design goals such as "improve risk score for a group of users" and "increase awareness of ransomware attacks" to goals-based requirement engine 284. Goals-based requirement engine 284 may act autonomously upon the one or more design goals.

According to some implementations, security awareness workflow recommendation engine 280 may identify one or more security awareness workflows which may be nearly appropriate for an organization to improve security awareness. In an implementation, security awareness workflow adjustment engine 282 may analyze the identified one or more security awareness workflows and determine if one or more parts of the one or more security awareness workflows need to be adjusted to make the one or more security awareness workflows more appropriate for the organization. In an implementation, security awareness workflow adjustment engine 282 may display recommendations for adjustments to a system administrator via a user interface (for example, administrator interface 266 or user interface 262). In example, upon receiving the recommendations for adjustments, the system administrator may be able to accept, adjust, or reject the recommendations. In some implementations, security awareness workflow adjustment engine 282 may implement the one or more recommended security awareness workflows and display the results of the implementation to the system administrator.

According to some implementations, reporting engine 286 may be configured to report the results of the implementation or the application of the security awareness workflows. In examples, the security awareness workflows may be ones defined by a system administrator of the organization, or the security awareness workflows may be ones recommended by security awareness workflow recommendation engine 280 (optionally adjusted by security awareness workflow adjustment engine 282) or by goals-based recruitment engine 284. In an implementation, reporting engine 286 may be responsible for reporting aspects of security awareness due to security awareness workflows. In examples, reporting engine 286 may report security awareness workflows which have been applied by an organization, the original source of the security awareness workflows where they were deployed previously by another organization, user attributes and organization attributes which are associated with the security awareness workflows and that led to a recommendation to the organization to use the security awareness workflows, outcomes in the organization due to the execution of the security awareness workflows, and adjustments to the security awareness workflows that were recommended, rejected, adjusted or accepted. In examples, the described outcomes may be measured and communicated via effectiveness criteria and effectiveness metrics as described above.

According to some implementations, reporting engine 286 may report the results of the implementation of the recommended security awareness workflows via an interface such as a user interface, a graphical application, a Web-based application (for example, HyperText Markup Language (HTML), JavaScript (JS), and Cascading Style Sheets (CSS)), or a Web page. In examples, the graphical application may present reports in any format, such as tabulated data, list data, graphical data including pie charts, trend graphs, bar charts, etc. In an implementation, reporting engine 286 may create text-based or binary log files, for example, via syslog or another logging system. In an example, syslog is a standard implementation of system-level logging. In examples, syslog separates system log generation and system log storage and allows a centralization of logs. In an example, a system administrator or any user may be able to interact with the report via an interface, for example, to drill down into more detail, to specify reporting detail, or other interactions. In examples, the system administrator or any user may be able to configure logging via a configuration file or configuration application that may specify logging levels, verbose vs terse output formatting, debug and diagnostic information, etc.

FIG. 5 depicts flowchart 500 for identification of a recommendation of one or more security awareness workflow configurations based on one or more effectiveness metrics, according to some embodiments.

In a brief overview of an implementation of flowchart 500, at step 502, one or more security awareness workflows may be deployed. In examples, the one or more security awareness workflows may deliver one or more remedial responses to one or more users in response to detection of one or more actions of the one or more users. At step 504, an effectiveness of the one or more security awareness workflows may be assessed. At step 506, one or more effectiveness metrics for the one or more security awareness workflows may be determined based at least on the assessment. In examples, the one or more effectiveness metrics may represent the effectiveness of the one or more security awareness workflows. At step 508, a recommendation of one or more security awareness workflow configurations may be identified based at least on the one or more effectiveness metrics.

Step 502 includes deploying one or more security awareness workflows. In examples, the one or more security awareness workflows may deliver one or more remedial responses to one or more users in response to detection of one or more actions of the one or more users. According to an implementation, security awareness workflow deployment engine 274 may be configured to deploy the one or more security awareness workflows within an organization. In examples, the one or more security awareness workflows may include one or more actions and one or more conditions to trigger the one or more actions. In examples, the one or more conditions may include one or more action criteria applied to the one or more actions of the one or more users.

Step 504 includes assessing an effectiveness of the one or more security awareness workflows. According to an implementation, security awareness workflow assessment engine 276 may be configured to assess the effectiveness of the one or more security awareness workflows.

Step 506 includes determining, based at least on the assessment, one or more effectiveness metrics for the one or more security awareness workflows. In examples, the one or more effectiveness metrics may represent the effectiveness of the one or more security awareness workflows. According to an implementation, security awareness workflow assessment engine 276 may be configured to determine, based at least on the assessment, one or more effectiveness metrics for the one or more security awareness workflows. In examples, the one or more effectiveness metrics may include a combination of one or more effectiveness criteria, changes in the one or more effectiveness criteria, one or more thresholds applied to the one or more effectiveness criteria or the one or more thresholds applied to the changes in the one or more effectiveness criteria. In examples, the one or more effectiveness metrics may include a count of occurrences of the one or more actions of the one or more users that pose a security risk and that trigger the one or more security awareness workflows. In examples, the one or more effectiveness metrics may include a count of the one or more users clicking on a link in a simulated phishing communication. In examples, the one or more users may be based at least on one or more user attributes.

Step 508 includes identifying, based on at least one of the one or more effectiveness metrics, a recommendation of one or more security awareness workflow configurations. According to an implementation, security awareness workflow recommendation engine 280 may be configured to identify, based on at least one of the one or more effectiveness metrics, the recommendation of one or more security awareness workflow configurations. In examples, the recommendation may include identification of one or more security awareness workflow configurations from other organizations.

According to some implementations, security awareness workflow recommendation engine 280 may be configured to display the recommendation of the one or more security awareness workflow configurations comprising a selection of one or more components of the one or more security awareness workflows to use in the one or more security awareness workflow configurations to a system administrator via an interface (for example, administrator interface 266 or user interface 262). According to some implementations, security awareness workflow recommendation engine 280 may be configured to display the recommendation of the one or more security awareness workflow configurations comprising the one or more security awareness workflows with a highest effectiveness score based at least on the one or more effectiveness metrics to a system administrator via an interface (for example, administrator interface 266 or user interface 262).

FIG. 6 depicts flowchart 600 for displaying a recommendation of one or more security awareness workflow configurations, according to some embodiments.

In a brief overview of an implementation of flowchart 600, at step 602, one or more security awareness workflows may be deployed. In examples, the one or more security awareness workflows may deliver one or more remedial responses to one or more users in response to detection of one or more actions of the one or more users. At step 604, an effectiveness of the one or more security awareness workflows may be assessed. At step 606, one or more effectiveness metrics for the one or more security awareness workflows may be determined based at least on the assessment. In examples, the one or more effectiveness metrics may represent the effectiveness of the one or more security awareness workflows. At step 608, a recommendation of one or more security awareness workflow configurations may be identified based at least on the one or more effectiveness metrics. At step 610, an effectiveness score of the one or more security awareness workflows may be determined for a group of one or more users based at least on the one or more effectiveness metrics. At step 612, the recommendation of the one or more security awareness workflow configurations including the one or more security awareness workflows with a highest effectiveness score based at least on the one or more effectiveness metrics may be displayed via an interface.

Step 602 includes deploying one or more security awareness workflows. In examples, the one or more security awareness workflows may deliver one or more remedial responses to one or more users in response to detection of one or more actions of the one or more users. According to an implementation, security awareness workflow deployment engine 274 may be configured to deploy the one or more security awareness workflows within an organization. In examples, the one or more security awareness workflows include one or more actions and one or more conditions to trigger the one or more actions. In examples, the one or more conditions may include one or more action criteria applied to the one or more actions of the one or more users.

Step 604 includes assessing an effectiveness of the one or more security awareness workflows. According to an implementation, security awareness workflow assessment engine 276 may be configured to assess the effectiveness of the one or more security awareness workflows.

Step 606 includes determining, based at least on the assessment, one or more effectiveness metrics for the one or more security awareness workflows. In examples, the one or more effectiveness metrics may represent the effectiveness of the one or more security awareness workflows. According to an implementation, security awareness workflow assessment engine 276 may be configured to determine one or more effectiveness metrics for the one or more security awareness workflows based at least on the assessment. In examples, the one or more effectiveness metrics may include a combination of one or more effectiveness criteria, changes in the one or more effectiveness criteria, one or more thresholds applied to the one or more effectiveness criteria or the one or more thresholds applied to the changes in the one or more effectiveness criteria. In examples, the one or more effectiveness metrics may include a count of occurrences of the one or more actions of the one or more users that pose a security risk and that trigger the one or more security awareness workflows. In examples, the one or more effectiveness metrics may include a count of the one or more users clicking on a link in a simulated phishing communication. In examples, the one or more users may be based at least on one or more user attributes.

Step 608 includes identifying, based on at least one of the one or more effectiveness metrics, a recommendation of one or more security awareness workflow configurations. According to an implementation, security awareness workflow recommendation engine 280 may be configured to identify the recommendation of one or more security awareness workflow configurations based on at least one of the one or more effectiveness metrics. In examples, the recommendation may include identification of one or more security awareness workflow configurations from other organizations.

Step 610 includes determining, based at least on the one or more effectiveness metrics, an effectiveness score of the one or more security awareness workflows for a group of one or more users. According to an implementation, security awareness workflow assessment engine 276 may be configured to determine the effectiveness score of the one or more security awareness workflows for a group of one or more users based at least on the one or more effectiveness metrics. According to some implementations, security awareness workflow assessment engine 276 may be configured to determine an action reduction threshold for a number of occurrences of the one or more actions of the one or more users within a time period. According to some implementations, security awareness workflow assessment engine 276 may be configured to determine a classification of effectiveness of the one or more security awareness workflows by calculating a residual between the action reduction threshold and the effectiveness score of the one or more security awareness workflows.

Step 612 includes displaying, via an interface, the recommendation of the one or more security awareness workflow configurations comprising the one or more security awareness workflows with a highest effectiveness score based at least on the one or more effectiveness metrics. According to an implementation, security awareness workflow recommendation engine 280 may be configured to display the recommendation of the one or more security awareness workflow configurations comprising the one or more security awareness workflows with a highest effectiveness score based at least on the one or more effectiveness metrics to a system administrator via an interface (for example, administrator interface 266 or user interface 262).

FIG. 7 depicts another flowchart 700 for displaying a recommendation of one or more security awareness work-flow configurations, according to some embodiments.

In a brief overview of an implementation of flowchart 700, at step 702, one or more security awareness workflows may be deployed. In examples, the one or more security awareness workflows may deliver one or more remedial responses to one or more users in response to detection of one or more actions of the one or more users. At step 704, an effectiveness of the one or more security awareness workflows may be assessed. At step 706, one or more effectiveness metrics for the one or more security awareness workflows may be determined based at least on the assessment. In examples, the one or more effectiveness metrics may represent the effectiveness of the one or more security awareness workflows. At step 708, a recommendation of one or more security awareness workflow configurations including the selection of one or more components of the one or more security awareness workflows to use in the one or more security awareness workflow configurations may be identified based at least on the one or more effectiveness metrics. At step 710, the recommendation of the one or more security awareness workflow configurations may be displayed via an interface.

Step 702 includes deploying one or more security aware-ness workflows. In examples, the one or more security awareness workflows may deliver one or more remedial responses to one or more users in response to detection of one or more actions of the one or more users. According to an implementation, security awareness workflow deploy-ment engine 274 may be configured to deploy the one or more security awareness workflows within an organization. In examples, the one or more security awareness workflows may include one or more actions and one or more conditions to trigger the one or more actions. In examples, the one or more conditions may include one or more action criteria applied to the one or more actions of the one or more users.

Step 704 includes assessing an effectiveness of the one or more security awareness workflows. According to an imple-mentation, security awareness workflow assessment engine 276 may be configured to assess the effectiveness of the one or more security awareness workflows.

Step 706 includes determining, based at least on the assessment, one or more effectiveness metrics for the one or more security awareness workflows. In examples, the one or more effectiveness metrics may represent the effectiveness of the one or more security awareness workflows. According to an implementation, security awareness workflow assess-ment engine 276 may be configured to determine, based at least on the assessment, one or more effectiveness metrics for the one or more security awareness workflows. In examples, the one or more effectiveness metrics may include a combination of one or more effectiveness criteria, changes in the one or more effectiveness criteria, one or more thresholds applied to the one or more effectiveness criteria or the one or more thresholds applied to the changes in the one or more effectiveness criteria. In examples, the one or more effectiveness metrics may include a count of occur-rences of the one or more actions of the one or more users that pose a security risk and that trigger the one or more security awareness workflows. In examples, the one or more effectiveness metrics may include a count of the one or more users clicking on a link in a simulated phishing communi-cation. In an example, the one or more users may be based at least on one or more user attributes.

Step 708 includes identifying, based on at least one of the one or more effectiveness metrics, a recommendation of one or more security awareness workflow configurations com-prising a selection of one or more components of the one or more security awareness workflows to use in the one or more security awareness workflow configurations. According to an implementation, security awareness workflow recom-mendation engine 280 may be configured to identify the recommendation of one or more security awareness work-flow configurations comprising a selection of one or more components of the one or more security awareness work-flows to use in the one or more security awareness workflow configurations based on at least one of the one or more effectiveness metrics. In examples, the recommendation may include identification of one or more security awareness workflow configurations from other organizations.

Step 710 includes displaying, via an interface, the rec-ommendation of the one or more security awareness work-flow configurations. According to an implementation, secu-rity awareness workflow recommendation engine 280 may be configured to display the recommendation of the one or more security awareness workflow configurations to a sys-tem administrator via an interface (for example, administra-tor interface 266).

The systems described above may provide multiple ones of any or each of those components and these components may be provided on either a standalone machine or, in some embodiments, on multiple machines in a distributed system. The systems and methods described above may be imple-mented as a method, apparatus or article of manufacture using programming and/or engineering techniques to pro-duce software, firmware, hardware, or any combination thereof. In addition, the systems and methods described above may be provided as one or more computer-readable programs embodied on or in one or more articles of manu-facture. The term "article of manufacture" as used herein is intended to encompass code or logic accessible from and embedded in one or more computer-readable devices, firm-ware, programmable logic, memory devices (e.g., EEPROMs, ROMs, PROMS, RAMS, SRAMs, etc.), hard-ware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless trans-mission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:

deploying, by one or more servers, one or more security awareness workflows associated with one or more actions of one or more users, each of the one or more security awareness workflows comprising: (i) an action element representing an action of a user of the one or more users associated with a security risk; (ii) a condition element specifying a condition for triggering execution of the security awareness workflow based on the action element; (iii) a response element specifying a remedial response to be delivered to the user, (iv) a target element that identifies the user or a group of users to whom the remedial response is to be delivered and (v) a channel element that specifies a medium for delivering the remedial response based at least on the action, conditions for the action and the target element; wherein the security awareness workflow is executed by the one or more servers upon detection of the action and satisfaction of the condition;

executing, by the one or more servers responsive to detection of the action of the user and the satisfaction of the condition, the remedial response of the security awareness workflow of the one or more security awareness workflows;

determining, by the one or servers, one or more effectiveness metrics for the one or more security awareness workflows, the one or more effectiveness metrics representing the effectiveness of the one or more security awareness workflows at reducing a number of actions of the one or more users associated with the security risk;

identifying, by the one or more servers based at least on the one or more effectiveness metrics, a recommendation of changing a configuration of the security awareness workflow of the one or more security awareness workflows, wherein the recommendation comprises changing a configuration of at least one of: (i) the action element, (ii) the condition element, or (iii) the response element of the security awareness workflow; and re-executing, by the one or more servers, the security awareness workflow as reconfigured according to the recommendation.

2. The method of claim 1, wherein each of the one or more security awareness workflows further comprise: a schedule element that specifies timing or periodicity for delivering the remedial response of the response element.

3. The method of claim 1, wherein the one or more effectiveness metrics comprise a combination of one or more effectiveness criteria, changes in the one or more effectiveness criteria, one or more thresholds applied to the one or more effectiveness criteria or the one or more thresholds applied to the changes in the one or more effectiveness criteria.

4. The method of claim 1, wherein the one or more effectiveness metrics comprise a count of occurrences of the one or more actions of the one or more users that pose a security risk and that trigger the one or more security awareness workflows.

5. The method of claim 1, wherein the one or more effectiveness metrics comprise a count of the one or more users clicking on a link in a simulated phishing communication, wherein the one or more users are based at least on one or more user attributes.

6. The method of claim 1, further comprising determining, by the one or more servers based at least on the one or more effectiveness metrics, an effectiveness score of the one or more security awareness workflows for the group of users.

7. The method of claim 1, further comprising determining, by the one or more servers, an action reduction threshold for a number of occurrences of the one or more actions of the one or more users within a time period.

8. The method of claim 7, further comprising determining, by the one or more servers, a classification of effectiveness of the one or more security awareness workflows by calculating a residual between the action reduction threshold and an effectiveness score of the one or more security awareness workflows.

9. The method of claim 1, further comprising displaying, by the one or more servers, via an interface, the recommendation of the one or more security awareness workflows comprising a selection of one or more components of the one or more security awareness workflows to use in one or more security awareness workflow configurations.

10. The method of claim 1, further comprising displaying, by the one or more servers, via an interface, the recommendation of the one or more security awareness workflows comprising the one or more security awareness workflows with a highest effectiveness score based at least on the one or more effectiveness metrics.

11. The method of claim 1, wherein the recommendation includes identification of one or more security awareness workflow configurations from other organizations.

12. A system comprising:

one or more servers comprising one or more one or more processors, coupled to memory and configured to:

deploy one or more security awareness workflows associated with one or more actions of one or more users, each of the one or more security awareness workflows comprising: (i) an action element representing an action of a user of the one or more users associated with a security risk; (ii) a condition element specifying a condition for triggering execution of the security awareness workflow based on the action element; (iii) a response element specifying a remedial response to be delivered to the user, (iv) a target element that identifies the user or a group of users to whom the remedial response is to be delivered and (v) a channel element that specifies a medium for delivering the remedial response based at least on the action, conditions for the action and the target element; wherein the security awareness workflow is executed by the one or more servers upon detection of the action and satisfaction of the condition;

execute, responsive to detection of the action of the user and the satisfaction of the condition, the remedial response of the security awareness workflow of the one or more security awareness workflows;

determine one or more effectiveness metrics for the one or more security awareness workflows, the one or more effectiveness metrics representing the effectiveness of the one or more security awareness workflows at reducing a number of actions of the one or more users associated with the security risk;

identify, based at least on the one or more effectiveness metrics, a recommendation of changing a configuration of the security awareness workflow of the one or more security awareness workflows, wherein the recommendation comprises changing the configuration of at least one of: (i) the action element, (ii) the condition element, or (iii) the response element of the security awareness workflow; and re-execute the security awareness workflow as reconfig-
ured according to the recommendation.

13. The system of claim 12, wherein each of the one or
more security awareness workflows further comprise: a
schedule element that specifies timing or periodicity for
delivering the remedial response of the response element.

14. The system of claim 12, wherein the one or more
effectiveness metrics comprise a combination of one or more
effectiveness criteria, changes in the one or more effective-
ness criteria, one or more thresholds applied to the one or
more effectiveness criteria or the one or more thresholds
applied to the changes in the one or more effectiveness
criteria.

15. The system of claim 12, wherein the one or more
effectiveness metrics comprise a count of occurrences of the
one or more actions of the one or more users that pose a
security risk and that trigger the one or more security
awareness workflows.

16. The system of claim 12, wherein the one or more
effectiveness metrics comprise a count of the one or more
users clicking on a link in a simulated phishing communi-
cation, wherein the one or more users are based at least on
one or more user attributes.

17. The system of claim 12, wherein the one or more
servers are further configured to determine, based at least on
the one or more effectiveness metrics, an effectiveness score
of the one or more security awareness workflows for the
group of users.

18. The system of claim 12, wherein the one or more
servers are further configured to determine an action reduc-
tion threshold for a number of occurrences of the one or
more actions of the one or more users within a time period.

19. The system of claim 12, wherein the one or more
servers are further configured to determine classification of
effectiveness of the one or more security awareness work-
flows by calculating a residual between the action reduction
threshold and an effectiveness score of the one or more
security awareness workflows.

20. The system of claim 12, wherein the one or more
servers are further configured to display, via an interface, the
recommendation of the one or more security awareness
workflows comprising a selection of one or more compo-
nents of the one or more security awareness workflows to
use in one or more security awareness workflow configura-
tions.

21. The system of claim 12, wherein the one or more
servers are further configured to display, via an interface, the
recommendation of the one or more security awareness
workflows comprising the one or more security awareness
workflows with a highest effectiveness score based at least
on the one or more effectiveness metrics.

22. The system of claim 12, wherein the recommendation
includes identification of one or more security awareness
workflow configurations from other organizations.

* * * * *